(12) United States Patent
Wu

(10) Patent No.: US 10,714,131 B1
(45) Date of Patent: Jul. 14, 2020

(54) UNIFIED DUAL FREE LAYER READER WITH SHARED REFERENCE LAYER TO ENABLE REDUCED READER-TO-READER SEPARATION

(71) Applicant: Headway Technologies, Inc., Milpitas, CA (US)

(72) Inventor: Yan Wu, Cupertino, CA (US)

(73) Assignee: Headway Technologies, Inc., Militas, CA (US)

( * ) Notice: Subject to any disclaimer, the term of this patent is extended or adjusted under 35 U.S.C. 154(b) by 0 days.

(21) Appl. No.: 16/275,375

(22) Filed: Feb. 14, 2019

(51) Int. Cl.
*G11B 5/39* (2006.01)
(52) U.S. Cl.
CPC .......... *G11B 5/3951* (2013.01); *G11B 5/3906* (2013.01); *G11B 5/398* (2013.01); *G11B 5/3909* (2013.01); *G11B 5/3912* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 6,911,710 B2 | 6/2005 | Nickel et al. | |
| 7,952,839 B2 | 5/2011 | Yamazaki et al. | |
| 8,179,642 B2 | 5/2012 | Kawamori et al. | |
| 8,503,135 B2 | 8/2013 | Covington et al. | |
| 8,675,318 B1 * | 3/2014 | Ho et al. | G11B 5/3912 360/324.11 |
| 9,041,391 B2 | 5/2015 | Gao et al. | |
| 9,111,550 B1 | 8/2015 | Liu et al. | |
| 9,123,886 B2 | 9/2015 | Zhang et al. | |
| 9,190,078 B2 | 11/2015 | Sapozhnikov et al. | |
| 9,230,577 B2 | 1/2016 | Zhang et al. | |
| 9,269,382 B1 * | 2/2016 | Bertero et al. | G11B 5/3932 |
| 9,286,921 B1 | 3/2016 | Sapozhnikov et al. | |
| 9,305,578 B1 | 4/2016 | Singleton et al. | |
| 9,401,162 B1 * | 7/2016 | Gao et al. | G11B 5/3948 |
| 9,406,321 B2 | 8/2016 | Kief et al. | |

(Continued)

OTHER PUBLICATIONS

"An Areal-Density Capability Study of SMR by using improved Write and Read Heads," by T. Kagami et al., Intermag 2011, IEICE Technical Committee Submission System, Conference Paper's Information, 3 pgs., Nov. 18, 2011.

*Primary Examiner* — Craig A. Renner
(74) *Attorney, Agent, or Firm* — Saile Ackerman LLC; Stephen B. Ackerman

(57) ABSTRACT

Reader-to-reader separation (RRS) is substantially decreased, and cross-track alignment of top and bottom sensors is improved with a process where a sidewall on the two sensors is formed during a single photolithography and ion beam etch sequence. RRS is minimized since the two sensors share a common reference layer (RL), and shields between the readers are omitted. A RL front portion is formed on a first stack of layers with a first free layer and uppermost first tunnel barrier, and a RL back portion is on a second stack comprising a reference layer and antiferromagnetic coupling layer sequentially formed on an antiferromagnetic layer. The RL may be a single layer or a synthetic antiferromagnetic structure so that the sensors operate in a common mode or differential mode, respectively. A third stack with a bottom second tunnel barrier and overlying second free layer is formed on the RL front portion.

16 Claims, 15 Drawing Sheets

(56) References Cited

U.S. PATENT DOCUMENTS

| | | |
|---|---|---|
| 9,437,225 B2 | 9/2016 | Quan et al. |
| 9,536,549 B1 * | 1/2017 | Ge et al. ............... G11B 5/3948 |
| 9,799,357 B1 | 10/2017 | Ding et al. |
| 9,830,935 B1 * | 11/2017 | Gao et al. ............ G11B 5/3951 |
| 9,870,790 B1 | 1/2018 | Hassan et al. |
| 2007/0081277 A1 | 4/2007 | Folks et al. |
| 2009/0279213 A1 | 11/2009 | Wu et al. |
| 2011/0051291 A1 | 3/2011 | Miyauchi et al. |
| 2011/0069417 A1 | 3/2011 | Kawamori et al. |
| 2011/0090595 A1 | 4/2011 | Hirata et al. |
| 2015/0199990 A1 | 7/2015 | Braganca et al. |
| 2015/0221328 A1 | 8/2015 | Le et al. |

* cited by examiner

UNIFIED DUAL FREE LAYER READER WITH SHARED REFERENCE LAYER TO ENABLE REDUCED READER-TO-READER SEPARATION

RELATED PATENT APPLICATIONS

This application is related to the following: U.S. Pat. No. 9,799,357; and Ser. No. 16/007,014, filing date Jun. 13, 2018; assigned to a common assignee and herein incorporated by reference in their entirety.

TECHNICAL FIELD

The present disclosure relates to a dual reader design wherein the two readers share a common reference layer to enable substantially reduced reader-to-reader separation (RRS), and may be connected to function as a single differential reader for enhanced resolution, and a process for making the same wherein the track width of both readers is defined by a single photolithography and ion beam etch (IBE) sequence thereby optimizing the cross-track alignment and improving area density capability (ADC).

BACKGROUND

In a magnetic recording device in which a read head comprises a magnetoresistive (MR) sensor, there is a constant drive to increase recording density. However, as areal density becomes higher, there is greater difficulty in designing reader sensors with improved signal to noise ratio (SNR) to facilitate reading data from the disk. Recently, magnetic recording heads having two readers that are stacked one above the other in the down-track direction have been introduced and implemented in products in order to enhance ADC. Existing designs utilize the two readers as independent readers. In today's design, the two readers are made sequentially and will have the typical alignment errors that are fundamentally limited by process capabilities. Also, with each reader having a tunnel barrier between a free layer and a pinned layer, and a top shield and bottom shield, there is a reader to reader separation (RRS) in the down-track direction. This RRS, and misalignment in the cross-track direction limits the region on the disk where the readers are aligned well enough to allow joined signal processing using the read back signal from the two sensors read at the same time on the same data track. This limits the total integrated capacity gain that is possible with a dual reader.

A longitudinal biasing scheme is typically used in a read head design to keep the free layer in a stable orientation in the absence of the external magnetic field. Bias films of high coercivity or soft bias also known as junction shields, are abutted against the edges of the MR sensor and particularly against the sides of the free layer. As the critical dimensions for MR sensor elements become smaller with higher recording density requirements, the free layer becomes more volatile and more difficult to bias. Top and bottom magnetic shields with in-plane magnetization are often used to ensure the MR sensor will only respond to a local magnetic field. Free layer magnetization is sensitive to domain wall motion in the bottom and top shields, which may lead to increased noise, reducing the SNR of the reader sensor and cause failure in decoding data from the media.

Thus, a new dual read head structure is needed wherein RRS is substantially reduced and cross-track alignment between reader sensors is improved to enable a maximum gain in ADC while maintaining acceptable SNR.

SUMMARY

One objective of the present disclosure is to provide a dual reader or multiple reader design that enables improved cross track alignment of the reader sensors, and a reduction in RRS compared with existing designs where each sensor is patterned with a different photolithography and etching sequence.

A second objective of the present disclosure is to provide a dual sensor connected in such a way to function as a single differential sensor, which will provide better resolution than achievable with current reader designs.

A third objective of the present disclosure is to provide a method of forming the dual or multiple reader structure according to the first and second objectives.

According to one embodiment of the present disclosure, each of the readers in a dual reader scheme has a sensor comprised of a free layer and a tunnel barrier layer. A key feature is that the sensors share a reference layer (RL) that is formed between a first free layer (FL1) in the first (bottom) reader and a second free layer (FL2) in the second (top) reader. The RL may be a single layer, or is comprised of a lower portion (RL1) and an upper portion (RL2) where RL1 and RL2 are separated by a first antiferromagnetic (AF) coupling layer (AFC1). Furthermore, each of FL1 and FL2 has a backside that is a first height (h1) and a second height (h2), respectively, from an air bearing surface (ABS) where h1<h3, and h2<h3, and h3 is a height of the backside of the RL from the ABS. RL magnetization is preferably stabilized through AF coupling with a pinned layer (PL) that is pinned by an antiferromagnetic (AFM) layer formed behind FL1 and below the RL.

The first sensor is comprised of a first stack of layers having a front side at the ABS, and including a first seed layer and first free layer (FL1), a first tunnel barrier layer (TB1), and a first bottom portion of the RL that are sequentially formed on a front portion of a bottom shield (BS1). A backend of the first stack is a planar surface comprised of the backsides FL1, and the BS1 front portion. A first insulation layer (INS1) such as alumina is formed on the first stack backend and separates the first stack from a second stack of layers comprised of a second seed layer, AFM layer, the pinned layer, an antiferromagnetic (AF) coupling layer, and a second bottom portion of the RL sequentially formed on a back portion of BS1 where the BS1 back portion top surface is a lesser down-track distance from the substrate than the BS1 front portion top surface. The AFM layer is used to set the magnetization direction of the PL. The second stack has a backend at h3 that abuts a front side of a second insulation layer (INS2).

An upper RL portion is formed on the first and second RL bottom portions and extends from the ABS to height h3. The upper RL portion is exchange coupled with the first and second RL bottom portions and thereby stabilizes the RL. Above the RL upper portion is a third stack of layers with a lower second tunnel barrier (TB2) layer, FL2, and an uppermost cap layer. The third stack has a planar backside that abuts a front side of a third insulation layer (INS3). The third stack and the RL (first and second lower portions and upper portion) form the second sensor while the first stack and RL form the first sensor. Accordingly, the dual reader of the present disclosure has a substantially reduced RRS because the top shield (TS1) for the bottom reader and bottom shield (BS2) for the top reader in existing designs are omitted as well as the dielectric layer that typically separates TS1 and BS2. The dual reader of the present disclosure further comprises a top shield (TS2) on the third stack, and a longitudinal biasing layer adjacent to both sides of the first and second sensors.

The two readers may be configured in a differential mode so the reader structure is essentially insensitive to ambient direct current (DC) fields, and to greatly enhance SNR when reading transitions. In one embodiment, there are single differential connections to BS1 and TS2. Alternatively, there may be a single connection from one end of the RL to BS1, and a second connection between BS1 and TS2, or there may be two differential connections with one connection from the RL to BS1 and a second connection from the RL to TS2.

The present disclosure also includes a process involving a sequence of steps to form the dual reader structure described above. After the first stack of layers is deposited on the bottom shield (BS1), and a first sacrificial magnetic layer (SL1) is formed on the first RL bottom portion, a first photoresist layer (PR1) is formed on SL1 and patterned to form a backside at h1. A first IBE process is employed to transfer the PR1 pattern through the first stack of layers and stops on a top surface of the BS1 back portion. After the second stack of layers is deposited on the BS1 back portion and a second sacrificial magnetic layer (SL2) is deposited on the second RL bottom portion, PR1 is stripped and a second IBE is used to remove SL1 and SL2. Thereafter, the upper portion of the RL is deposited to provide a single layer for RL, or the upper portion completes the RL1, and then a second AF coupling layer (AFC2), and RL2 are sequentially deposited on RL1 to yield a RL1/AFC2/RL2 configuration for the RL.

In other embodiments, the RL is a single ferromagnetic layer, or is a stack of more than two exchange coupled layers. Accordingly, the exchange coupling strength among the sub-layers in the stack may be optimized, and stack thickness may be adjusted to fine tune the distance between FL1 and FL2 so that resolution is enhanced for transitions at a certain target density.

At this point, a second photoresist layer (PR2) and a third IBE process are used to define a backside of the RL layer and second stack of layers at h3, and then INS2 is deposited on exposed portions of INS1. Next, the third stack is deposited on the RL and is patterned using a third photoresist layer (PR3) and a fourth IBE process to form a backside thereon at height h2. The third insulation layer (INS3) is deposited on exposed portions of the PL. After a planarization method is employed to form a top surface of INS3 that is coplanar with a top surface of the cap layer, a fourth photoresist layer (PR4) and a fifth IBE are used to define the sides of the dual reader structure. Accordingly, first and second sensors have the same sidewall and are bisected by the same center plane for optimum alignment. Thereafter, an insulation layer and longitudinal biasing layer are deposited on the sensor sidewalls, and the top shield TS2 is formed on the second sensor.

In an alternative embodiment where a third reader is formed above the second reader, sidewall formation on the first and second readers is delayed until after sequential deposition of a third reference layer (RL3) and a fourth stack of layers comprised of a lower third tunnel barrier layer (TB3), a third free layer (FL3), and a second cap layer on the third stack and INS3. A backside of the fourth stack is defined by a photolithography and IBE process. Then a fourth insulation layer (INS4) is deposited behind the third stack. After a planarization method to generate coplanar top surfaces for the second cap layer and INS4, a photolithography and IBE sequence are used to simultaneously provide sidewalls on the first, second, and third sensors.

DETAILED DESCRIPTION

Figure 1:
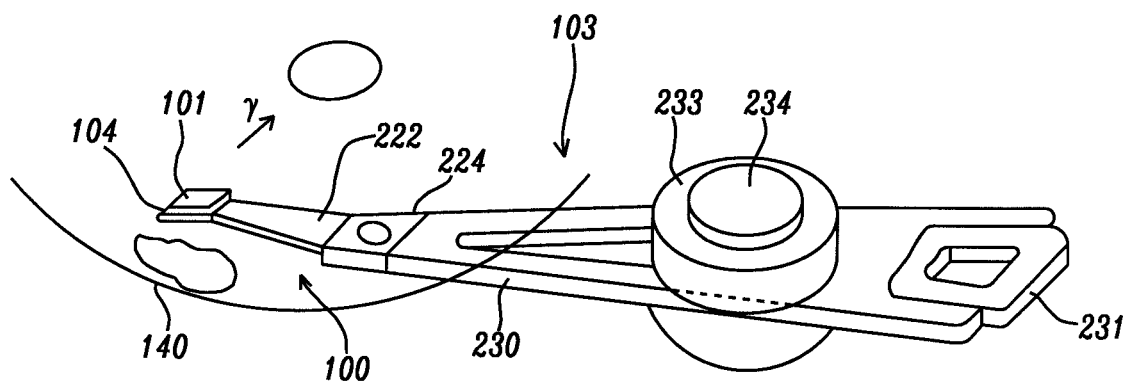
FIG. 1 is a perspective view of a head arm assembly of the present disclosure.

The present disclosure is a dual reader or multiple reader design wherein a first sensor in a bottom reader and a second sensor in a top (or middle) reader share a common reference layer, and have a common sidewall to minimize RRS and optimize cross-track alignment, respectively. The scheme may be expanded to include a third sensor above the second sensor where sidewalls on all three sensors are defined during a single photolithography and IBE sequence. SNR is improved over prior art single reader designs, which will result in improved ADC. In the drawings, the y-axis is in a cross-track direction, the z-axis is in the down-track direction, and the x-axis is in a direction orthogonal to the ABS and towards a back end of the read head. The term "behind" such as in "B behind A" means that feature B is a greater distance from the ABS than feature A. The terms "isolation layer" and "insulation layer" may be used interchangeably. A front side of a layer faces the ABS while a backside or backend of a layer faces away from the ABS.

Referring to FIG. 1, a head gimbal assembly (HGA) 100 includes a magnetic recording head 101 comprised of a slider and a combined read-write structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
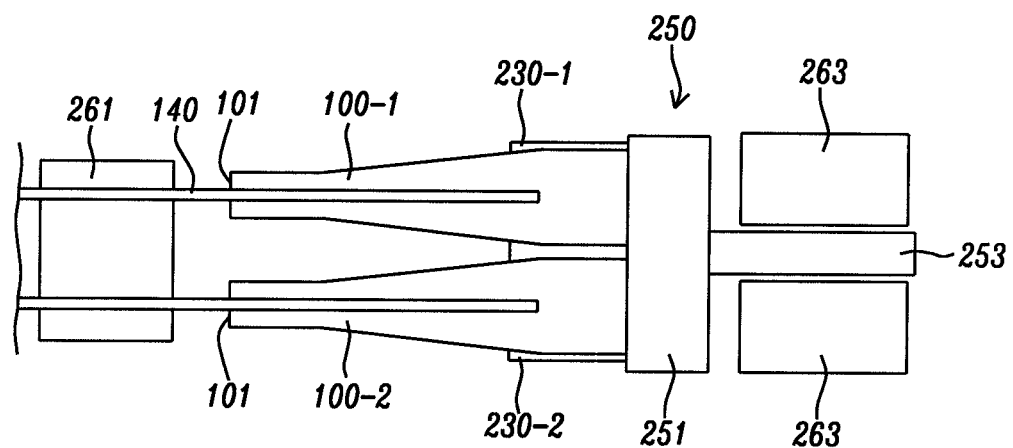
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion 253 of the voice coil motor is mounted at the opposite side of each arm in carriage 251. The voice coil motor has a permanent magnet 263 arranged at an opposite position across the coil 253.

Figure 3:
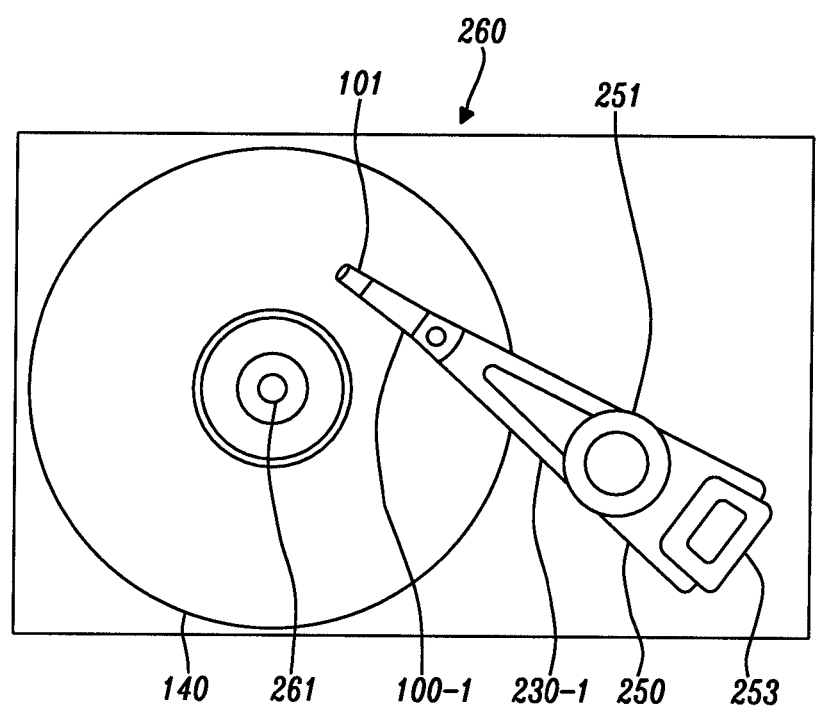
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to a spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a perpendicular magnetic recording (PMR) writer element (not shown) and reproduces the information recorded in the magnetic recording media by a magnetoresistive (MR) sensor element (not shown).

Figure 4:
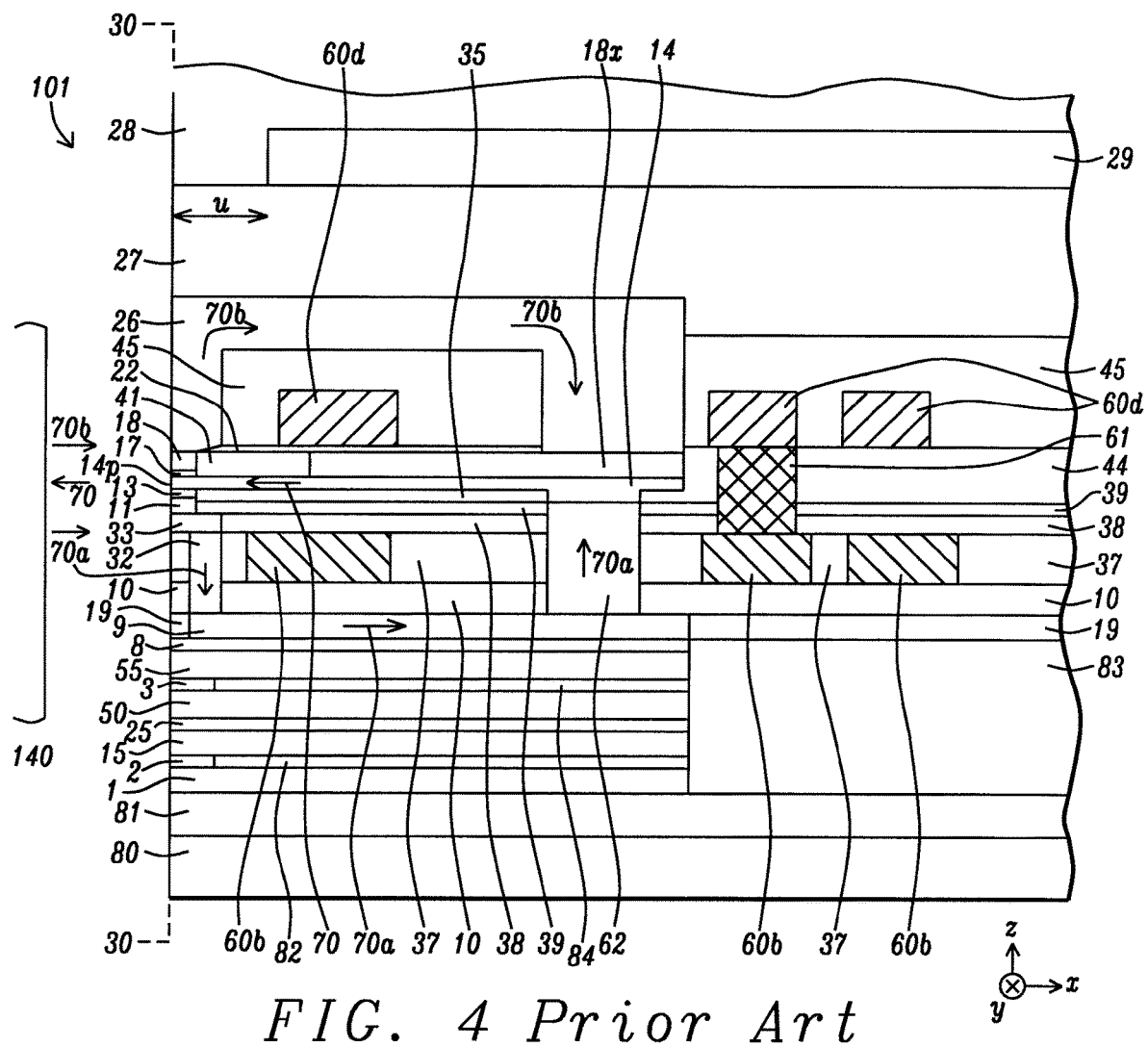
FIG. 4 is a down-track cross-sectional view of a combined read-write head wherein dual reader is formed between top and bottom shields according to a prior art design.

Referring to FIG. 4, magnetic recording head 101 comprises a combined read-write head with two readers previously fabricated by the inventors and disclosed in related application Ser. No. 16/007,014. The down-track cross-sectional view is taken along a plane formed orthogonal to the ABS 30-30, and that bisects the main pole layer 14. The dual reader is formed on a substrate 80 that may be comprised of AlTiC (alumina+TiC) with an overlying dielectric layer 81 that is made of a material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 1 is formed on dielectric layer 81.

A first magnetoresistive (MR) sensor 2 is formed on bottom shield (BS1) 1 at the ABS 30-30 and typically includes a plurality of layers that are described later with regard to FIG. 5. A top magnetic shield (TS1) 15 is formed on the first MR sensor. Layer 82 adjoins the backside of the first MR sensor, and is between BS1 and TS1. Above TS1, an isolation layer 25, second bottom shield (BS2) 50, second MR sensor 3, and second top shield (TS2) 55 are sequentially formed. Layer 84 adjoins the backside of the second MR sensor, and is between BS2 and TS2. An insulation layer 8 and a top shield (S2B) layer 9 are sequentially formed on TS2. The S2B layer 9 may serve as a flux return path (RTP) in the write head portion of the combined read/write head. Thus, the portion of the combined read/write head structure formed below layer 9 in FIG. 4 is typically referred to as a dual reader wherein a first reader includes BS1, the first MR sensor, and TS1, and the second reader comprises BS2, the second MR sensor, and TS2. Layer 83 contacts the backsides of the first and second MR sensors.

The present disclosure anticipates that various configurations of a write head (PMR writer) may be employed with the read head portion. In the exemplary embodiment, magnetic flux 70 in main pole layer 14 is generated with flowing a current through bucking coil 60b and driving coil 60d that are below and above the main pole layer, respectively, and are connected by interconnect 61. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, uppermost trailing (PP3) shield 26, and top yoke 18x. There is also a leading return loop for magnetic flux 70a that includes leading shield 11, leading shield connector (LSC) 33, S2B connector (S2C) 32, return path 9, and back gap connection (BGC) 62. The magnetic core may also comprise a bottom yoke 35 below the main pole layer. Dielectric layers 10, 44-13, 19, 22, 37-39, 41, 44 and 45 are employed as insulation layers around magnetic and electrical components. A protection layer 27 covers the PP3 trailing shield and is made of an insulating material such as alumina. Above the protection layer and recessed a distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
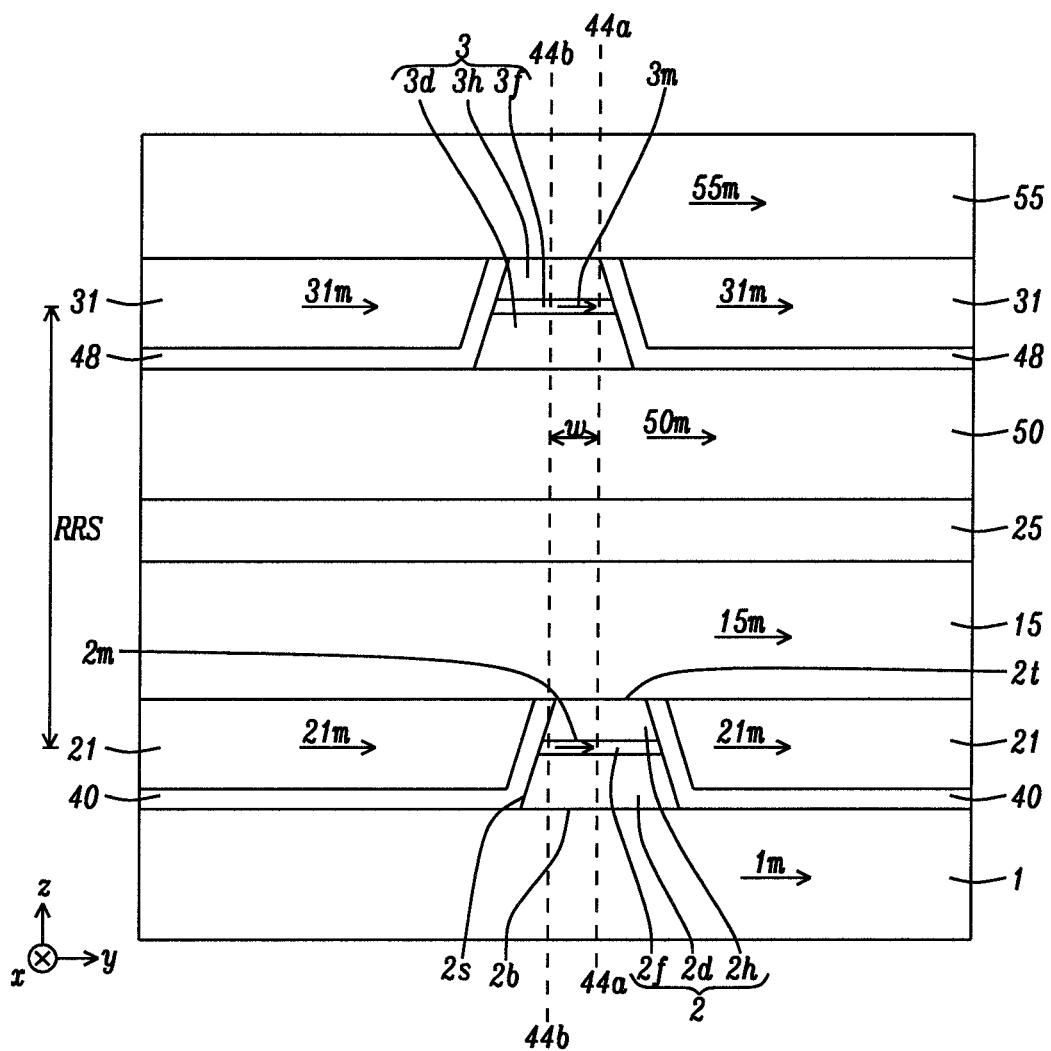
FIG. 5 is an ABS view of the dual reader structure in FIG. 4 where the bottom sensor is typically not aligned with the top sensor in a cross-track direction.

Referring to FIG. 5, an ABS view is shown of the dual reader in FIG. 4 wherein the first MR sensor 2 is comprised of a lower layer 2d, upper layer 2h, and middle free layer 2f with magnetization 2m that is stabilized with longitudinal biasing from magnetization 21m in adjacent junction shields 21. Sidewalls 2s connect a bottom surface 2b with the top surface 2t of the first MR sensor. There is a non-magnetic isolation layer 40 formed along the sidewalls 2s and on portions of BS1 1 with magnetization 1m that are not covered by the first MR sensor. Magnetization 15m in TS1 15 stabilizes the magnetization direction in the junction shields through exchange coupling. Layer 2h comprises at least a capping layer, and layer 2d includes a reference layer with a fixed magnetization direction, and a non-magnetic spacer (not shown) such as a tunnel barrier between the reference layer and free layer 2f. Layer 2d may also include a bottommost seed layer, and an antiferromagnetic (AFM) layer such as IrMn or another Mn alloy may be formed on a side of the reference layer that faces away from the free layer to pin the magnetization direction in the reference layer. In other embodiments, the AFM layer (not shown) may be recessed behind the first MR sensor stack or embedded in a back portion of BS1.

Above TS1 15 is an isolation (dielectric) layer 25 that magnetically and electrically isolates the first reader from a second (top) reader that includes a second MR sensor 3 comprised of bottom layer 3d, free layer 3f with magnetization 3m, and upper layer 3h where layers 3d, 3f, and 3h may have the same composition and function as layers 2d, 2f, and 2h, respectively. The second MR sensor is formed between a second bottom shield (BS2) 50 having magnetization 50m and a second top shield (TS2) 55. A second insulation layer 48 adjoins the sidewalls of the second MR sensor. Junction shields 31 formed on the second insulation layer have a magnetization 31m and are employed to provide a longitudinal bias to the free layer 3f magnetization direction. Magnetization 31m is in the same direction as magnetization 55m in TS2 because of ferromagnetic coupling. The center plane 44b-44b that bisects the second MR sensor may or may not overlay on the center plane 44a-44a that bisects the first MR sensor because the first and second sensors are fabricated with different photolithography and IBE sequences. Thus, there could be either an intentional offset or a misalignment w in the cross-track direction. Reader-to-reader spacing RRS is depicted as the down-track distance from the center of free layer 2f in the first reader to the center of free layer 3f in the second reader.

Figure 6A:
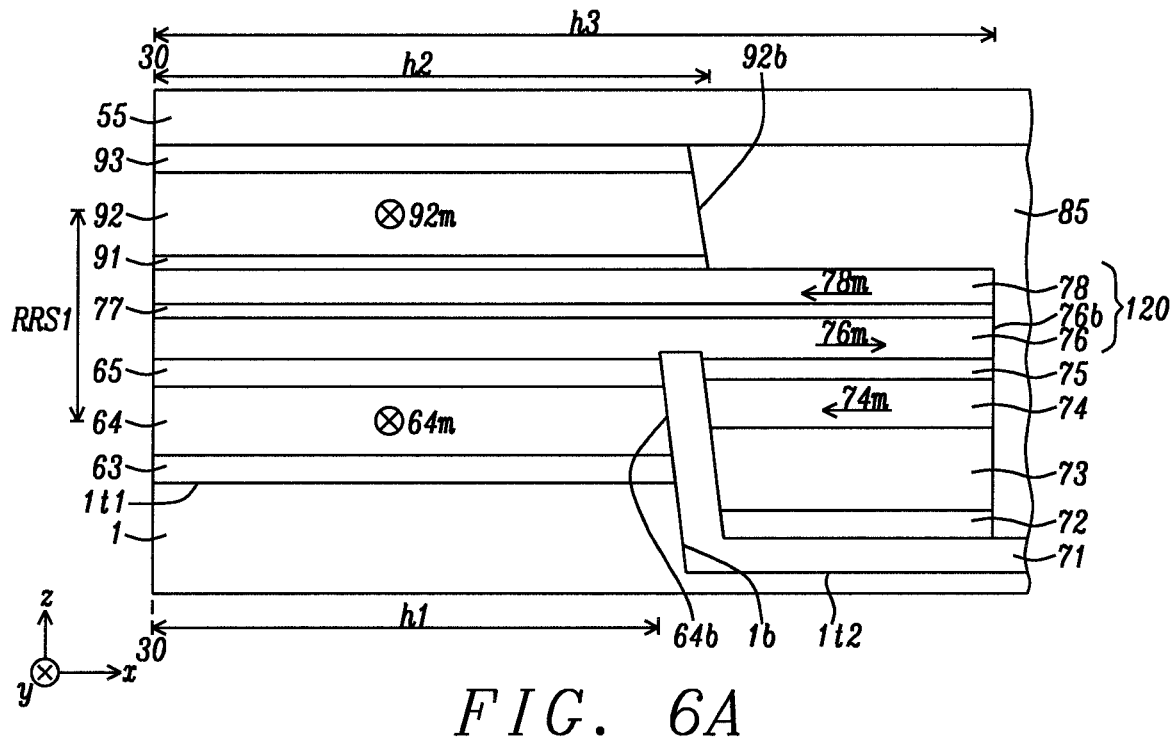
FIGS. 6A-6C are down-track cross-sectional views of a dual reader structure according to embodiments of the present disclosure wherein two sensors share a pinned layer formed between first and second tunnel barrier layers.

Referring to FIG. 6A, a first embodiment of a dual reader design of the present disclosure is depicted from a down-track cross-sectional view. An important feature is that reader-to-reader separation (RRS1) between a center of free layer (FL1) 64 in the first sensor and a center of the free layer (FL2) 92 in the second sensor is substantially less than RRS in the prior art design because TS1 15, BS2 50, and isolation layer 25 in FIG. 5 are omitted between the reader sensors. Moreover, instead of a reference layer in each sensor, the sensors share a reference layer (RL) 120 that has a synthetic antiferromagnetic (SAF) configuration with a lower RL1 layer 76, a middle AF coupling (AFC1) layer 77, and an upper RL2 layer 78. Accordingly, RRS1 may be ≤50 nm in some embodiments. Each of FL1, FL2, RL1, and RL2 may be a single layer or multilayer comprised of one or both of Co and Fe that may be alloyed with one or more of Ni, B, and with one or more non-magnetic elements such as W, Mo, Ta, and Cr. The single layer embodiment may have two or more ferromagnetically (exchange) coupled sub-layers. In a multilayer embodiment, two magnetic layers may be AF coupled through an AFC layer that is Ru, Rh, Ir, or Os, for example.

Figure 6B:
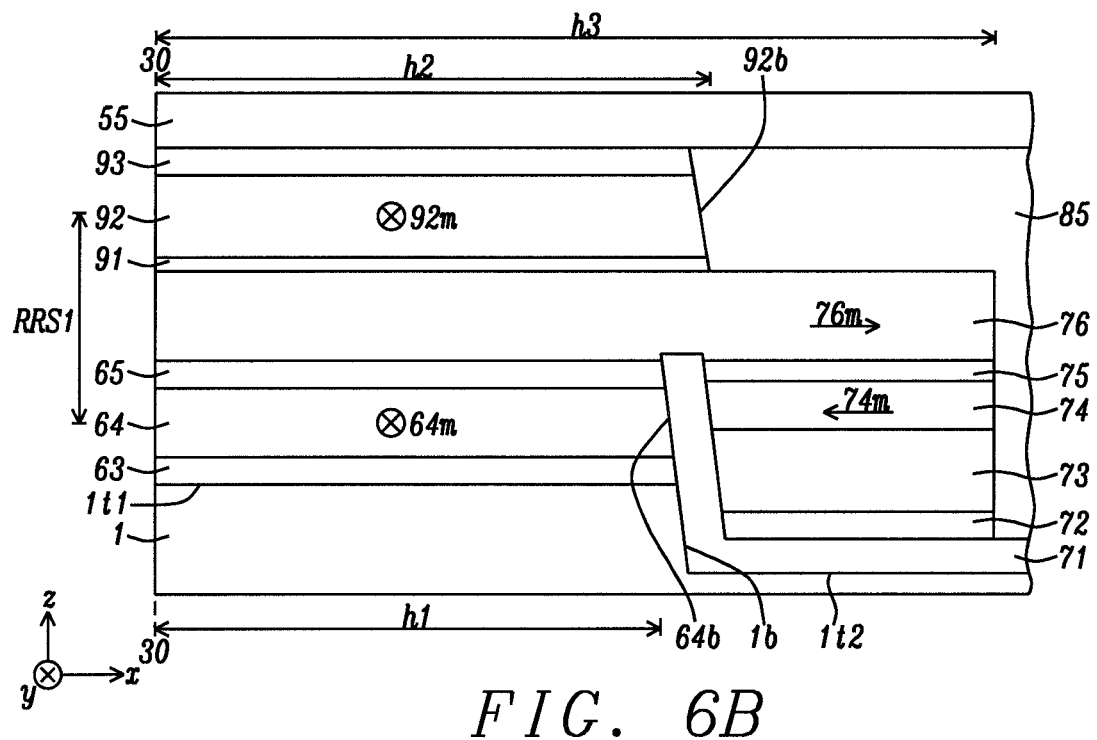

In alternative embodiment in FIG. 6B, the RL may be a single magnetic layer 76 that is AF coupled to an underlying pinned layer (PL) 74 through a AF coupling layer 75. RL is preferably comprised of one or both of Co and Fe that may be alloyed with one or more of Ni, B, and with one or more non-magnetic elements such as W, Mo, Ta, and Cr. Moreover, RL 76 may have two or more ferromagnetically coupled sub-layers as described later with respect to FIG. 11 where a first sub-layer (first RL bottom portion) 66 contacts a front side of INS1 71, a second sub-layer (second RL bottom portion) 76-1 adjoins a backside of INS1, and a third sub-layer 76-2 is formed above INS1. Each of the first and second sub-layers is stabilized through exchange coupling with the third sub-layer.

According to another embodiment in FIG. 6C, RL 120 in FIG. 6A is modified by adding an additional AF coupling layer (AFC2) 77b on RL2 78a, and a third reference layer (RL3) 78b on AFC2 to yield a RL1/AFC1/RL2/AFC2/RL3 stack where AFC1 77a is a first AF coupling layer, and 78m1 and 78m2 are RL2 and RL3 magnetizations, respectively, which may be used to adjust the spatial frequency as described later. All other aspects of the dual reader structure in FIG. 6A are retained in FIGS. 6B-6C.

Returning to FIG. 6A, the first sensor (sensor 4 in FIG. 7) has a first stack of layers with a front side at the ABS 30-30 and includes seed layer 63, FL1 64, and a first tunnel barrier layer (TB1) 65 sequentially formed on top surface 1t1 of the front portion of BS1 1. FL1 has a magnetization 64m in a cross-track direction in the absence of an external magnetic field. The first stack has a planar backside including a FL1 backside 64b at height h1 that is coplanar with a backside 1b of the BS1 front portion. Backside 1b stops at top surface 1t2 of the back portion of BS1. The first sensor also comprises RL 120 that in the exemplary embodiment has a RL1/AFC1/RL2 configuration where RL1 layer 76 contacts a top surface of TB1 65 and extends to a backside at height h3 that is typically less than 1 micron, and where h3>h1. AFC1 layer 77 and RL2 layer 78 with magnetization 78m are sequentially formed on the RL1 layer and also extend from the ABS to height h3. The RL1 layer has magnetization 76m in a transverse direction that is stabilized through antiferromagnetic (AF) coupling to magnetization 74m in PL 74 where the PL is pinned by AFM layer 73. RL2 magnetization 78m is aligned opposite to magnetization 76m and parallel to PL magnetization 74m. The PL and AFM layer are in a second stack of layers recessed behind the first stack. The seed layer typically includes one or more metals such as Ta, Ti, Ru, and Mg, an alloy such as NiCr, or a nitride (TiN or TaN) that promote uniform thickness and the desired crystal growth in overlying layers.

There is a first insulation layer (INS1) 71 formed on the backside of the first stack of layers, and on BS1 backside 1b, and on BS1 top surface 1t2. INS1 is preferably one or more of $Al_2O_3$, TaOx, SiN, AlN, $SiO_2$, MgO, and NiO, and separates the first stack of layers from a second stack of layers comprised of lower seed layer 72, AFM layer 73, PL 74, and AF coupling layer 75. In all embodiments, the second stack of layers also has a backside at height h3 that adjoins a front side of a second insulation layer (INS2) 86, which may be made of one of the materials used for INS1. There is a third insulation layer INS3 85 formed on a back portion of RL2 layer 78 and behind a backside of the second sensor that is comprised of backside 92b of FL2 92. Previously, in related U.S. Pat. No. 9,799,357, we disclosed a recessed AFM layer in a single reader with the advantage of reduced spacing between top and bottom shields.

Figure 6C:
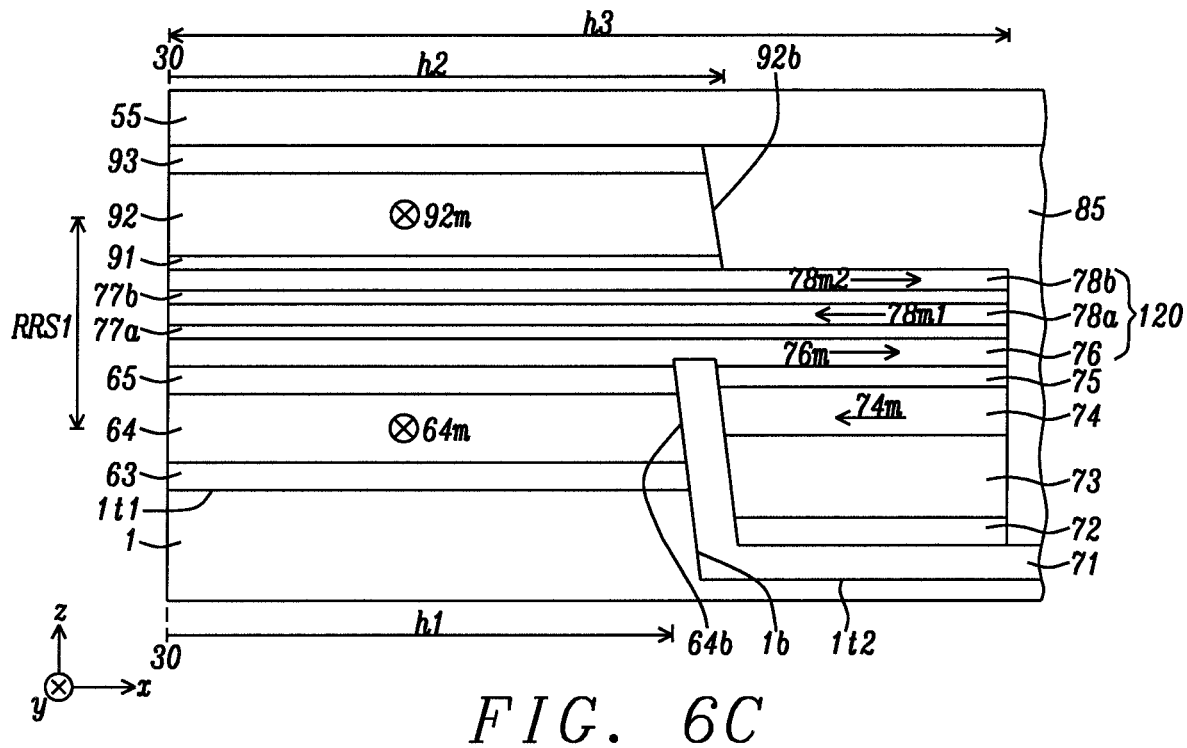

The second sensor (sensor 5 in FIG. 7) is comprised of a third stack of layers with a front side at the ABS 30-30 and includes second tunnel barrier (TB2) 91, FL2 92, and a cap layer 93 sequentially formed on a front portion of RL2 78, RL 76, or RL2 78b as shown in FIG. 6A, FIG. 6B, and FIG. 6C, respectively. FL2 has magnetization 92m in the same cross-track direction as FL1 in the absence of an external magnetic field. The third stack has a planar backside including FL2 backside 92b at height h2 where h2<h3. The second sensor also comprises RL 120 (or RL 76). A top shield (TS2) 55 is formed on coplanar top surfaces of the cap layer and INS3 85. As described later, h1 may be unequal to h2 because the backsides of the first and second sensors are defined during different photolithography and IBE sequences. The cap layer may be one or more of Ta, Ru, W, Mo, Ti, Cu, Ir, or other conductive metals. Each of TB1 65 and TB2 is preferably a metal oxide that is one or more of MgO, $Al_2O_3$, MgAlO, TiOx, TaOx, AlTiO, MgZnO, $Al_2O_3$, ZnO, ZrOx, HfOx, or MgTaO.

BS1 1 and TS2 55 typically extend to a backend (not shown) that is 10 microns or more from the ABS 30-30, have a magnetization saturation (Ms) value from 5 kG to 15 kG, and are generally comprised of CoFe, CoFeNi, CoFeN, or NiFe, or a combination thereof. In some embodiments, one or both of BS1, TS2, and junction shields 21 shown in FIG. 7 may be comprised of stacks of magnetic materials separated by one or more non-magnetic materials (such as Ru, Cr, Rh, Ir, Mo, Re, and Os) that provide AF coupling between magnetic layers.

Figure 7:
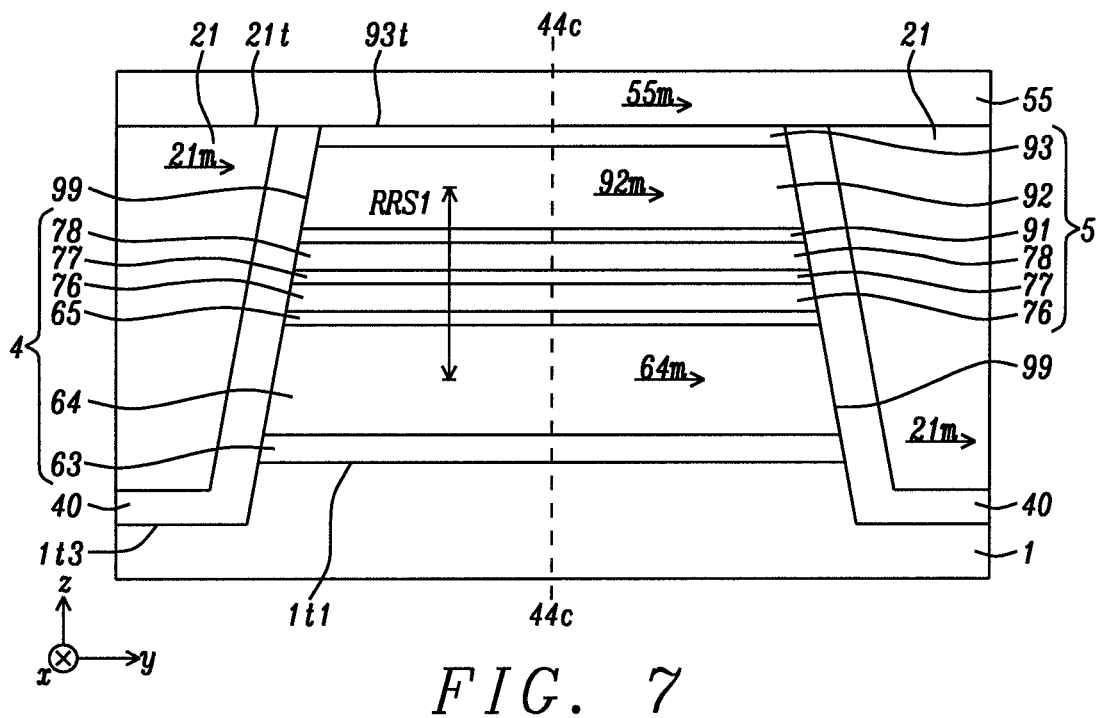
FIG. 7 is an ABS view of the dual reader structure in FIG. 6 showing reduced RRS and improved cross-track alignment compared with the prior art design in FIG. 5.

Referring to FIG. 7, an ABS view of the dual reader structure in FIG. 6A is illustrated. A key feature is that center plane 44c-44c bisects both of the first sensor 4 and second sensor 5 to avoid misalignment that occurs in the prior art design in FIG. 5. The sensors have common sidewalls 99 equidistant from the center plane that are formed during a single photolithography and IBE sequence as explained in a later section. Isolation layer 40 adjoins sidewall 99 and a portion of BS1 top surface 1t3 on each side of the center plane. A junction shield 21 is disposed on the isolation layer on each side of the center plane, and has a top surface 21t that is coplanar with a top surface 93t of cap layer 93. Each junction shield has magnetization 21m in a cross-track direction that provides longitudinal biasing to FL1 magnetization 64m and to FL2 magnetization 92m. As indicated earlier, TS2 magnetization 55m has a stabilizing effect on magnetization 21m because of ferromagnetic coupling.

Figure 8A:
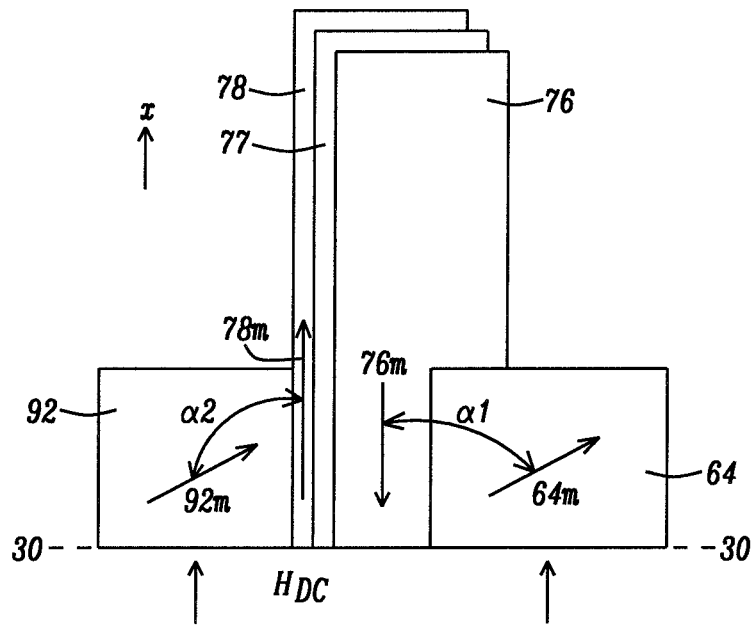
FIG. 8A and FIG. 8B are schematic drawings that depict free layers in the dual reader structure of FIG. 6A wherein FL magnetizations rotate in response to a DC field, and AC field, respectively.
Figure 8B:
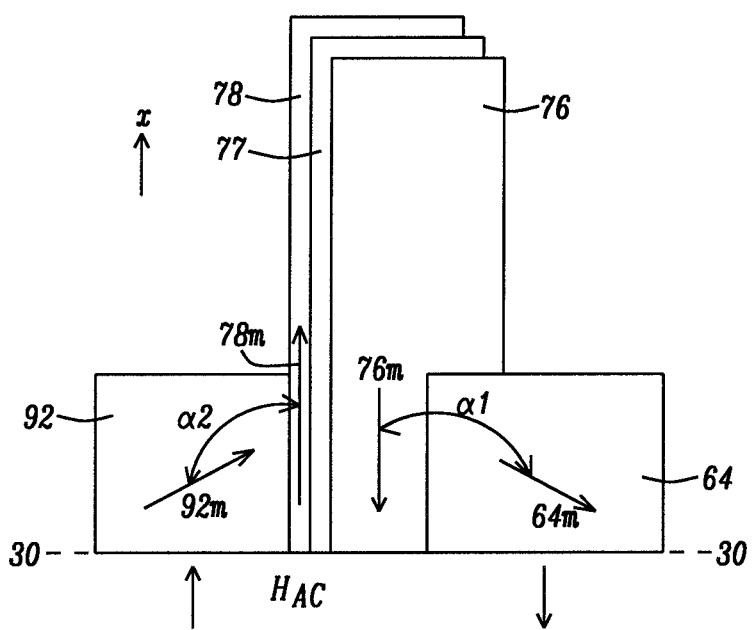

The sensors in a dual reader may operate in a common mode or differential mode with respect to direct current (DC) or alternating current (AC) field sensitivity. The desired configuration is achieved by using appropriate electrical connections as defined later, or setting the RL and/or FL1 and FL2 orientations individually. Common mode is defined as an embodiment where both FL1 64 and FL2 92 rotate in the same direction under DC field, and their response will add to each other. On the other hand, the response from FL1 and FL2 rotation under a DC field ($H_{DC}$) will cancel each other and generate a negligible read signal (proximate to zero) in a differential mode. In FIG. 8A that depicts DC field excitation, the readout signal from FL1 depends on the cosine of angle α1 between FL1 magnetization 64m and RL1 magnetization 76m, and the readout signal from FL2 depends on the cosine of angle α2 between FL2 magnetization 92m and RL2 magnetization 78m. On the other hand, under AC field ($H_{AC}$) excitation in a differential mode, FL1 and FL2 magnetizations will have opposite orientations and the readout signal from the two free layers will add to each other as depicted in FIG. 8B.

In an embodiment where the two sensors are connected in series, the orientation of FL1 and FL2 under zero external field is in the same direction. Two modes are realized by implementing different RL configurations and with setting an appropriate magnetization direction in each FM layer within the RL. A differential mode configuration for the dual sensor structure is represented by FIG. 6A. With the removal of one reference layer (RL2 78) and AFC1 77 as shown in FIG. 6B, or the addition of one reference layer (RL3 78b) and AFC2 77b as shown in FIG. 6C, a common mode configuration is realized.

Since only the free layer magnetizations rotate under the media field of interest, the down-track distance between FL1 and FL2 determines spatial frequency sensitivity. Thus, the down-track thickness of RL 120 (or RL 76) may be adjusted to tune the spatial frequency through increasing or decreasing a thickness of one or more reference layers, or with the addition or removal of a reference layer and AFC layer.

The present disclosure also encompasses a method of fabricating a dual reader wherein two sensors share a reference layer as depicted in FIGS. 6A-6C. In the exemplary fabrication sequence in FIGS. 9-17, the steps used to make the dual reader in FIG. 6A and FIG. 7 are described. Note that plane 30-30 in FIGS. 9-16 is an eventual ABS that is not formed until all layers in the combined read-write head structure are formed, and a lapping process is performed as appreciated by those skilled in the art.

Figure 9:
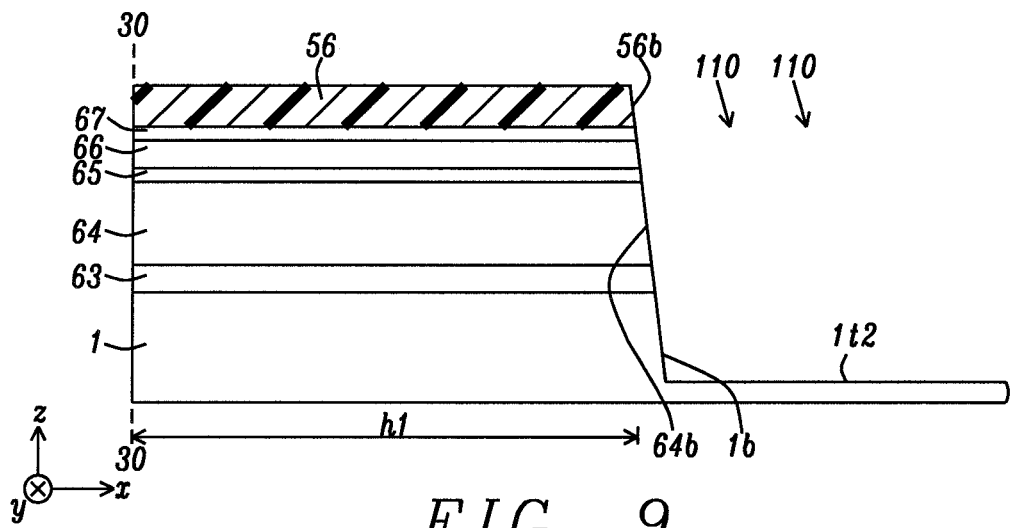
FIGS. 9-16 are down-track cross-sectional views showing a sequence of steps in forming the dual reader structure in FIG. 6A.

Referring to FIG. 9, a first step in the fabrication sequence begins with the sequential deposition of a first stack of layers comprised of seed layer 63, FL1 64, TB1 65, first RL sub-layer 66, and sacrificial magnetic layer (SL1) 67 on BS1 1. Photoresist layer (PR1) 56 is coated on a top surface of SL1 and is patterned with a photolithography process to form a PR1 backside 56b. Thereafter, PR1 serves as an etch mask as an IBE 110 is performed to transfer the PR1 pattern through the first stack of layers and through an exposed portion of BS1 to stop at BS1 top surface 1t2 thereby forming FL1 backside 64b that is coplanar with backside 1b of the BS1 front portion.

Figure 10:
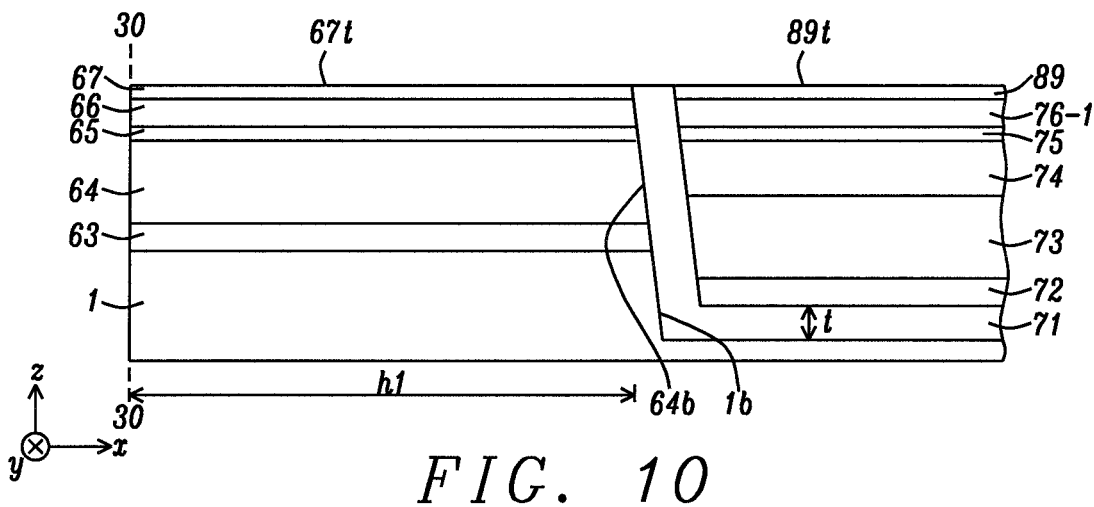

Referring to FIG. 10, first insulation layer (INS1) 71 with a thickness t is deposited on BS1 top surface 1t2, and on the backside of the first stack including FL1 backside 64b and BS1 backside 1b. Then, seed layer 72, AFM layer 73, PL 74, AF coupling layer 75, second RL sub-layer 76-1, and sacrificial magnetic layer (SL2) 89 are sequentially deposited on INS1 71. Preferably, SL2 has a top surface 89t that is coplanar with the SL1 top surface 67t. Each of SL1 and SL2 has a thickness from 1 nm to 10 nm.

Figure 11:
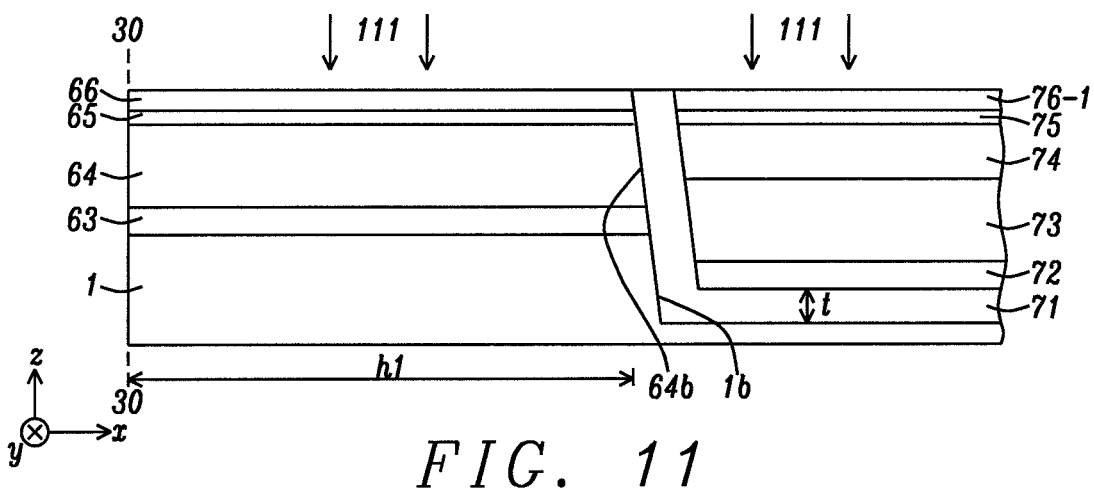
Figure 12:
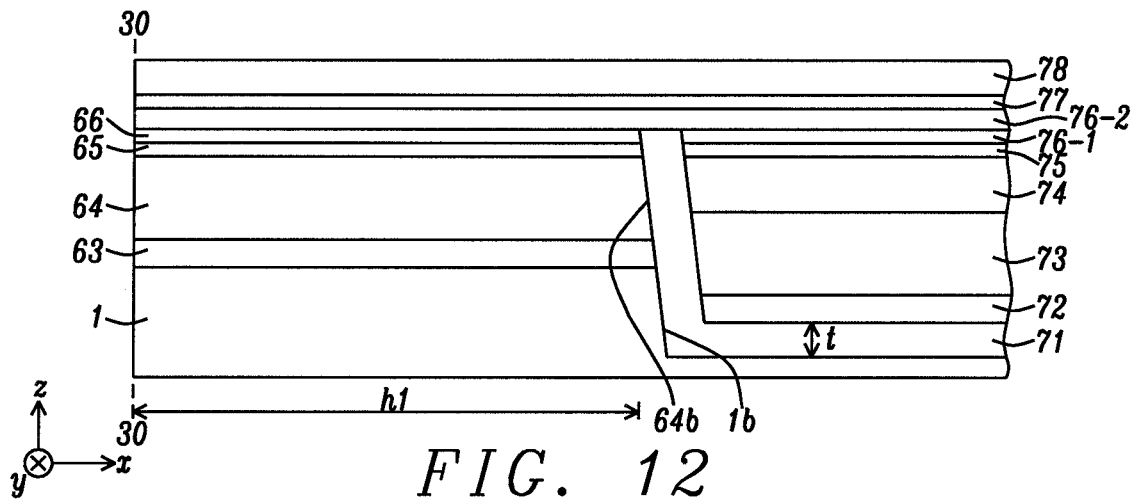
Figure 13:
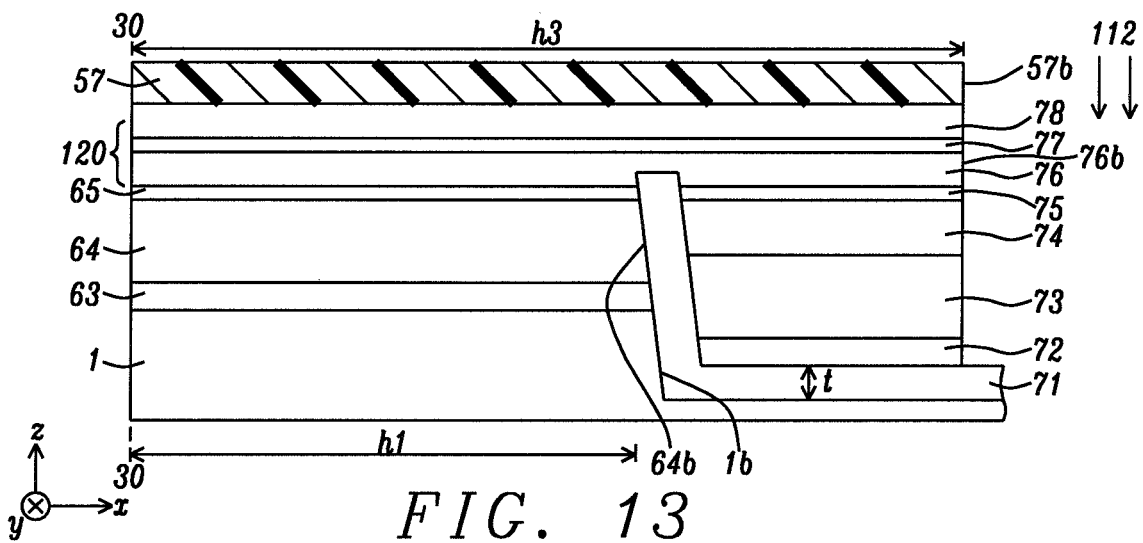

In FIG. 11, an IBE process 111 is performed to remove SL1 67 and SL2 89. The IBE may also remove upper portions of RL sub-layers 66, 76-1. FIG. 12 depicts the intermediate dual reader structure after third RL sub-layer 76-2, AFC1 77, and RL2 78 are sequentially deposited on RL sub-layers 66, 76-1. As shown in FIG. 13, RL sub-layers 66, 76-1, and 76-2 may be considered as a single RL (RL1 76 in the exemplary embodiment).

Referring to FIG. 13, another photoresist layer (PR2) 57 is coated on the top surface of RL2 78, and a photolithography process is used to form PR2 backside 57b at height h3 from the ABS 30-30. Next, PR2 serves as an etch mask while another IBE process 112 is employed to transfer the PR2 pattern through RL 120 and the second stack of layers and stops on INS1 71 thereby forming a RL backside 76b at height h3.

Figure 14:
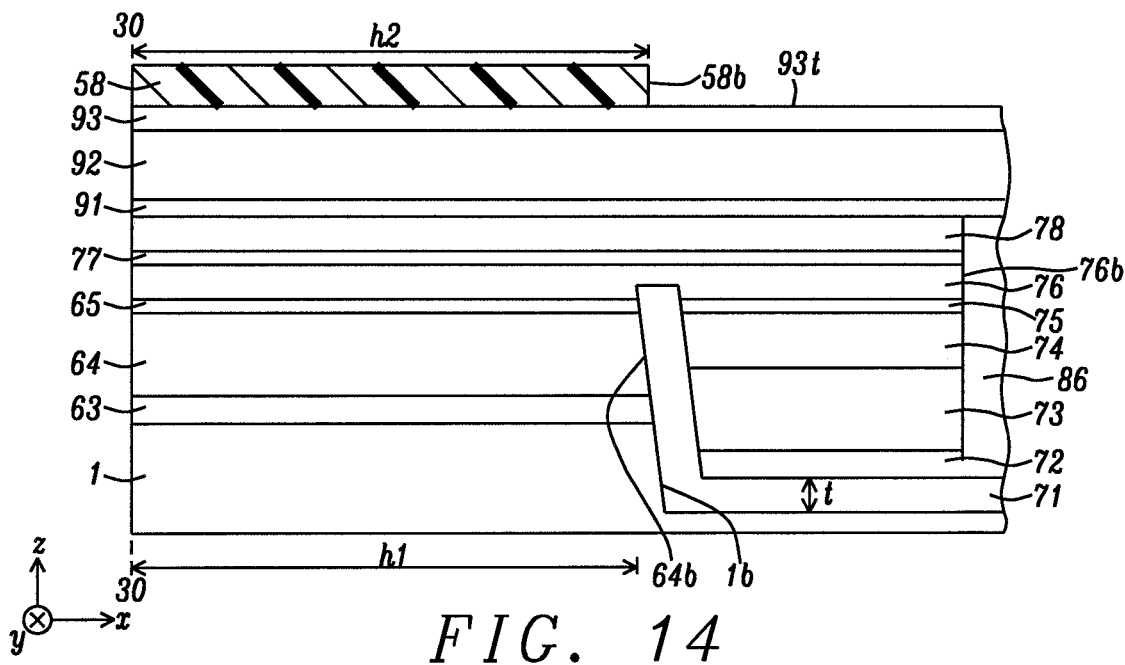

Referring to FIG. 14, second insulation layer (INS2) 86 is deposited in the opening generated by IBE 112, PR2 is stripped, and then the third stack of layers including second tunnel barrier (TB2) 91, FL2 92, and cap layer 93 are sequentially formed on RL2 78. A third photoresist layer (PR3) 58 is coated on the cap layer and patterned with a photolithography process to yield a backside 58b that will be used to define a backside of the third stack of layers.

Figure 15:
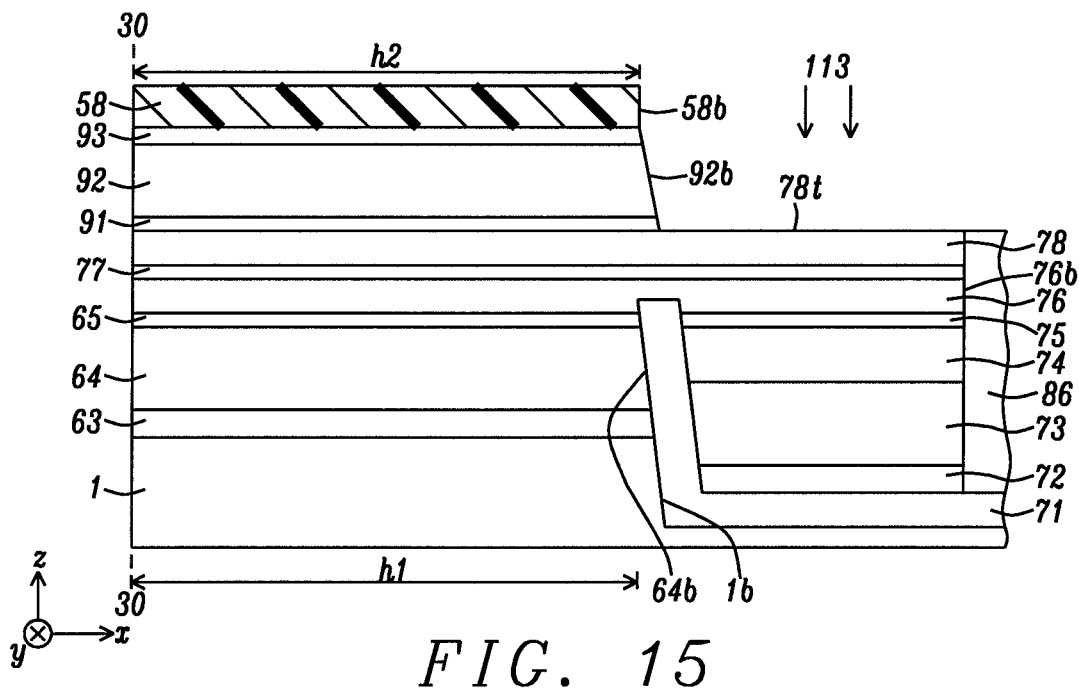

In FIG. 15, an IBE process 113 is employed to transfer the PR3 pattern through the third stack of layers and stops on the top surface 78t of RL2 78 thereby generating a backside on the third stack including FL2 backside 92b at height h2. Note that h2 may be unequal to h1 since FL2 backside 92b is formed during a different photolithography and IBE sequence than FL1 backside 64b.

Figure 16:
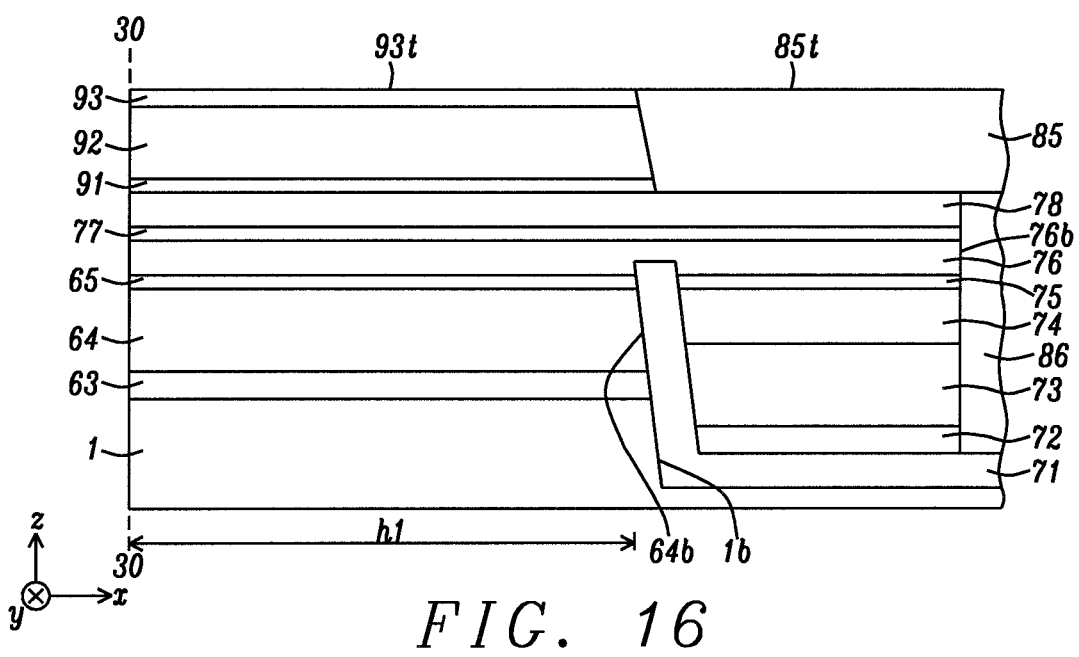

Referring to FIG. 16, a third insulation layer (INS3) 85 is deposited in the opening generated by IBE process 113. Deposition may be controlled such that INS3 top surface 85t is essentially coplanar with cap layer top surface 93t after PR3 58 is removed.

Figure 17:
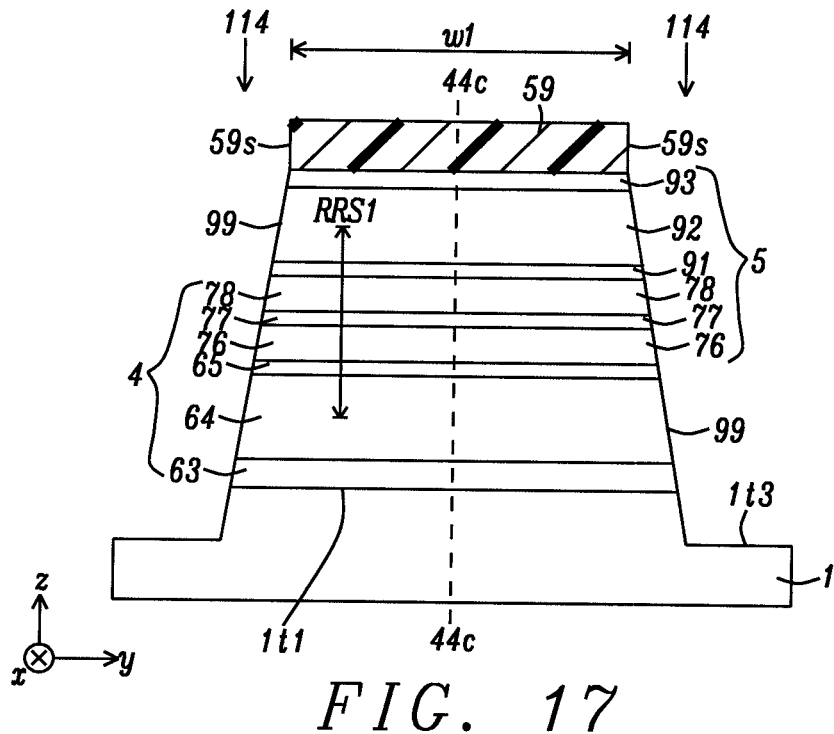
FIG. 17 is an ABS view showing a single photoresist and IBE sequence used to simultaneously form sidewalls on the first and second sensors in the dual reader structure of FIG. 7.

In FIG. 17, an ABS view is shown of an intermediate dual reader structure after PR3 is removed, and a fourth photoresist (PR4) 59 is coated and patterned on cap layer 93 to yield a PR4 island having sidewalls 59s, and width w1 that is bisected by center plane 44c-44c. PR4 serves as an etch mask while another IBE process 114 is performed to remove portions of the first stack, second stack, and third stack that are not protected by the PR4 mask thereby providing sidewall 99 on each side of the center plane. The IBE process stops at BS1 top surface 1t3. The bottom sensor (sensor 4) is comprised of seed layer 63, FL1 64, TB1 65 and the RL that has the RL1 76/AFC1 77/RL2 78 configuration in the exemplary embodiment. The top sensor (sensor 5) includes the RL (76/77/78), TB2 91, FL2 92, and cap layer 93. Thereafter, isolation layer 40 and junction shields 21 are successively formed followed by PR4 removal, and then deposition of TS2 55 to provide the dual reader structure in FIG. 7.

Figure 18:
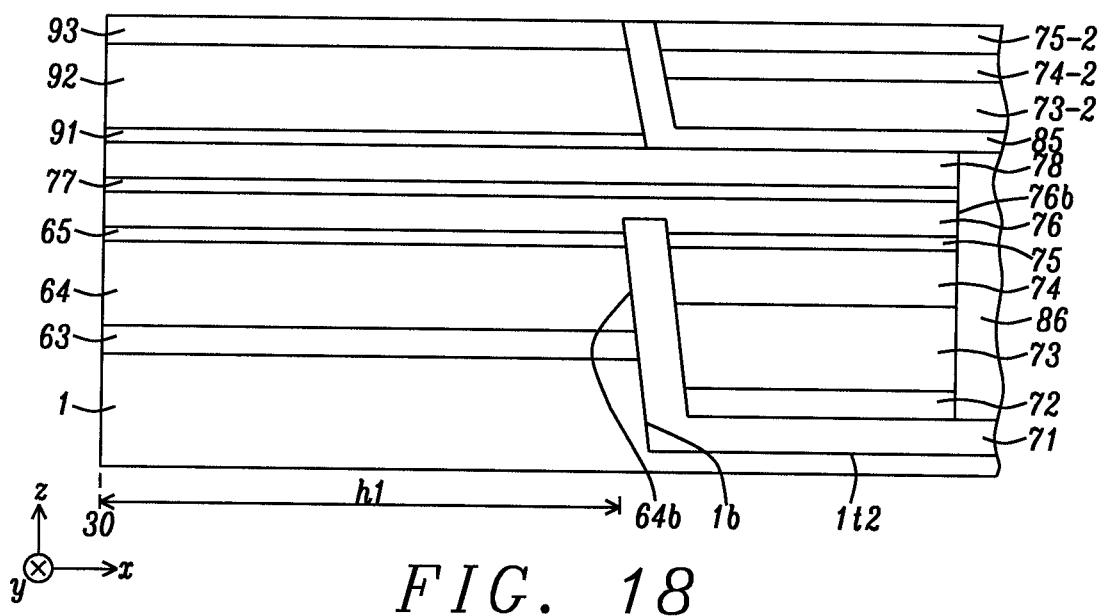
FIGS. 18-19 are down-track cross-sectional views depicting intermediate sensor structures during a fabrication sequence of forming a triple reader according to an embodiment of the present disclosure.

According to a second embodiment shown in FIGS. 18-22, the aforementioned fabrication sequence may be modified to form a triple reader structure. In particular, the process flow deviates from the first embodiment in that the intermediate structure in FIG. 16 is modified to include a fourth stack of layers with AFM layer 73-2, PL 74-2, and AF coupling layer 75-2 sequentially formed on INS3 85 such that the fourth stack is separated from FL 92 by INS3, and AF coupling layer 75-2 has a top surface 75t coplanar with cap layer top surface 93t as shown in FIG. 18.

Figure 19:
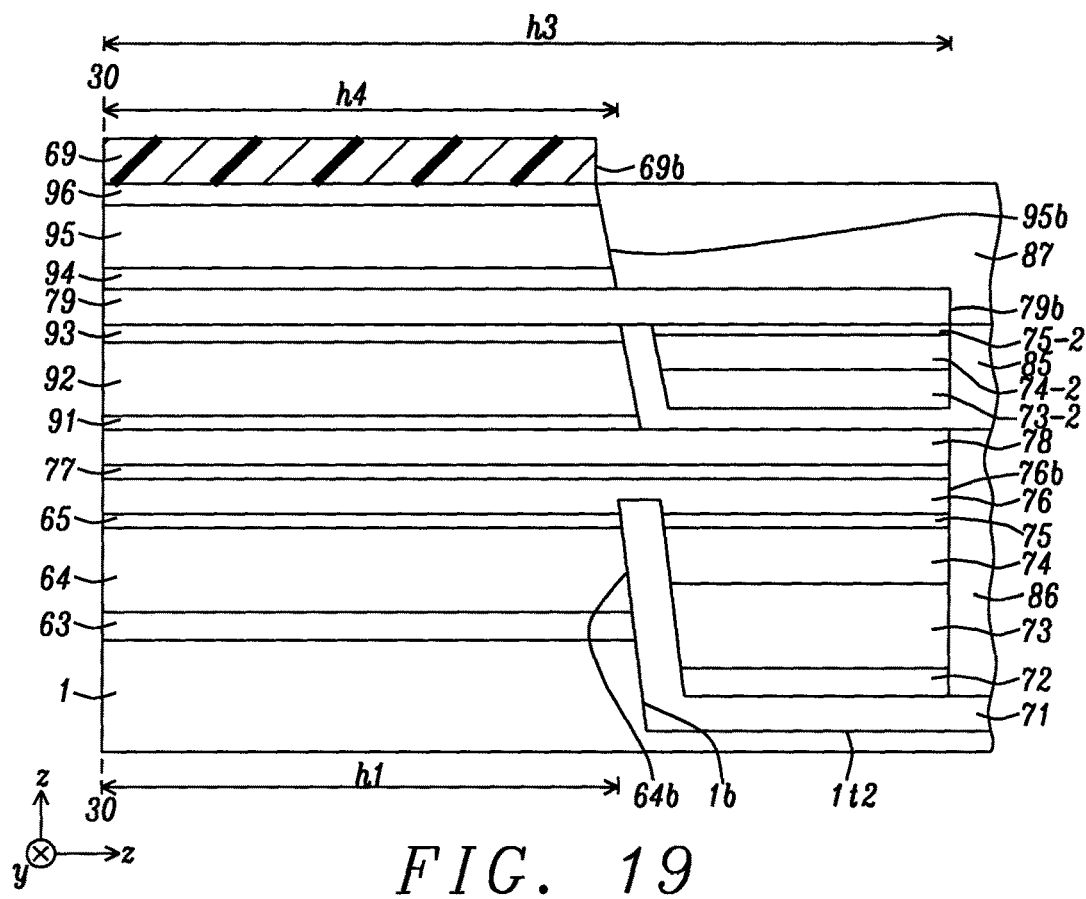

FIG. 19 shows an intermediate structure after a third reference layer (RL3) 79 is deposited on cap layer 93 and on AF coupling layer 75-2. The AF coupling layer is used to set the magnetization direction (not shown) in PL 74-2, which is AF coupled to RL3. A RL3 backside 79b proximate to height h3 may be defined in a separate photolithography and IBE sequence (not shown), and is coplanar with a backside on each of layers 73-2, 74-2, and 75-2. Then, a fifth stack of layers comprising a third tunnel barrier (TB3) 94, third free layer (FL3) 95, and cap layer 96 are sequentially formed on RL3. A fifth photoresist layer (PR5) 69 is coated on cap layer 96 and patterned to yield a PR5 backside 69b. Next, an IBE process forms a FL3 backside 95b at height h4 where h4<h3, and a backside of the HT 18-009 fourth stack that stops on PL3 79. A fourth insulation layer (INS4) 87 is deposited on exposed portions of RL3 and adjoins a backside of the fifth stack of layers.

Figure 20:
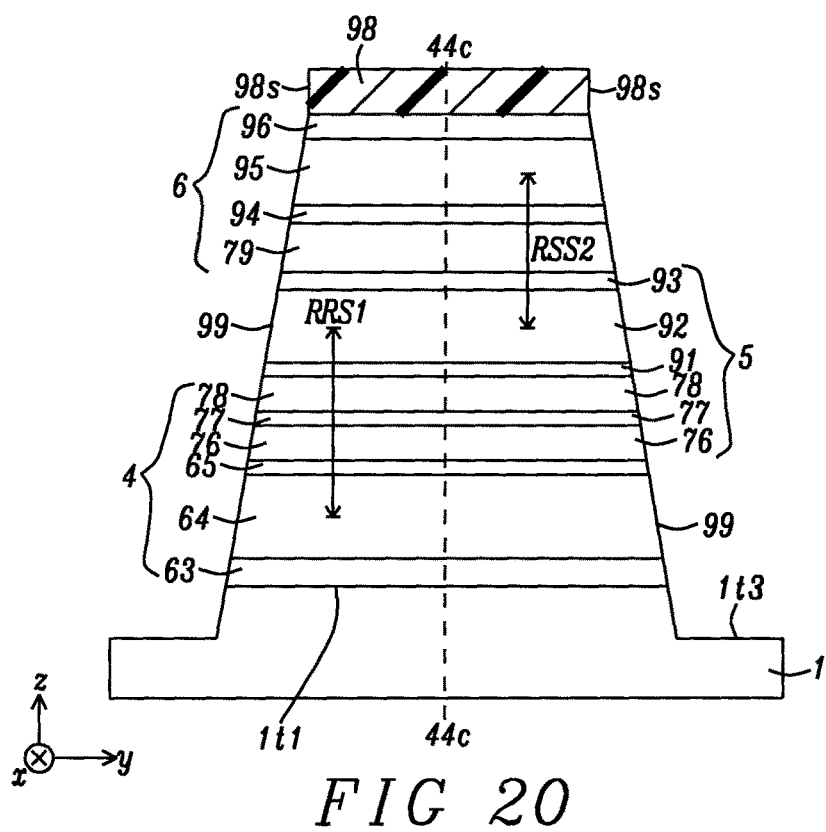
FIG. 20 is an ABS view showing a single photoresist and IBE sequence used to simultaneously form sidewalls on the first, second, and third sensors in a triple reader according to an embodiment of the present disclosure.

With regard to FIG. 20, PR5 is removed by a conventional method and then a sixth photoresist (PR6) 98 is coated on cap layer 96 and patterned with a photolithography process to form an island (etch mask) bisected by center plane 44c-44c and having sides 98s. Then, an IBE process is employed to remove portions of the first, second, and third sensors not protected by the etch mask and thereby provide sidewall 99 on each side of the center plane. The IBE process stops at BS1 top surface 1t3. In this embodiment, sensor 4 is the lower (first) sensor, sensor 5 is the middle (second) sensor, and sensor 6 is the top (third sensor). The third sensor is comprised of RL3 79, TB3 94, FL3 95, and cap layer 96.

Figure 21:
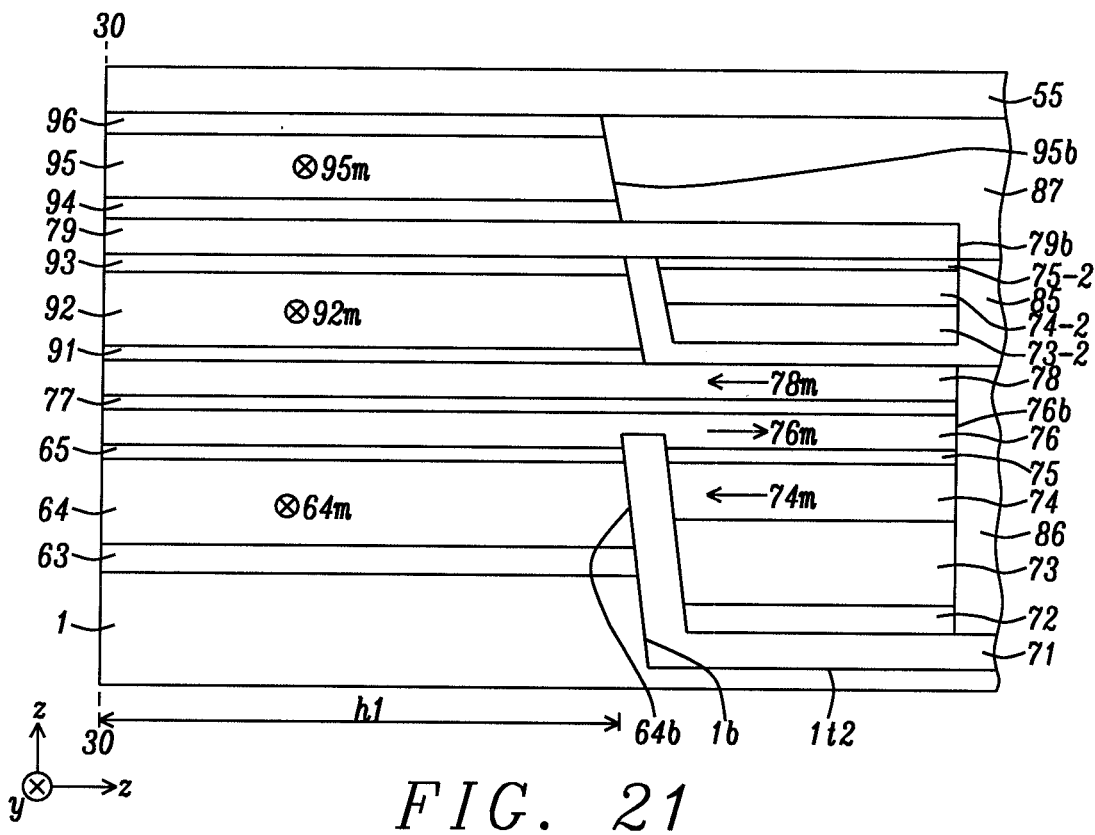
FIG. 21 is a down-track cross-sectional view depicting three sensors in a triple reader structure according to an embodiment of the present disclosure.
Figure 22:
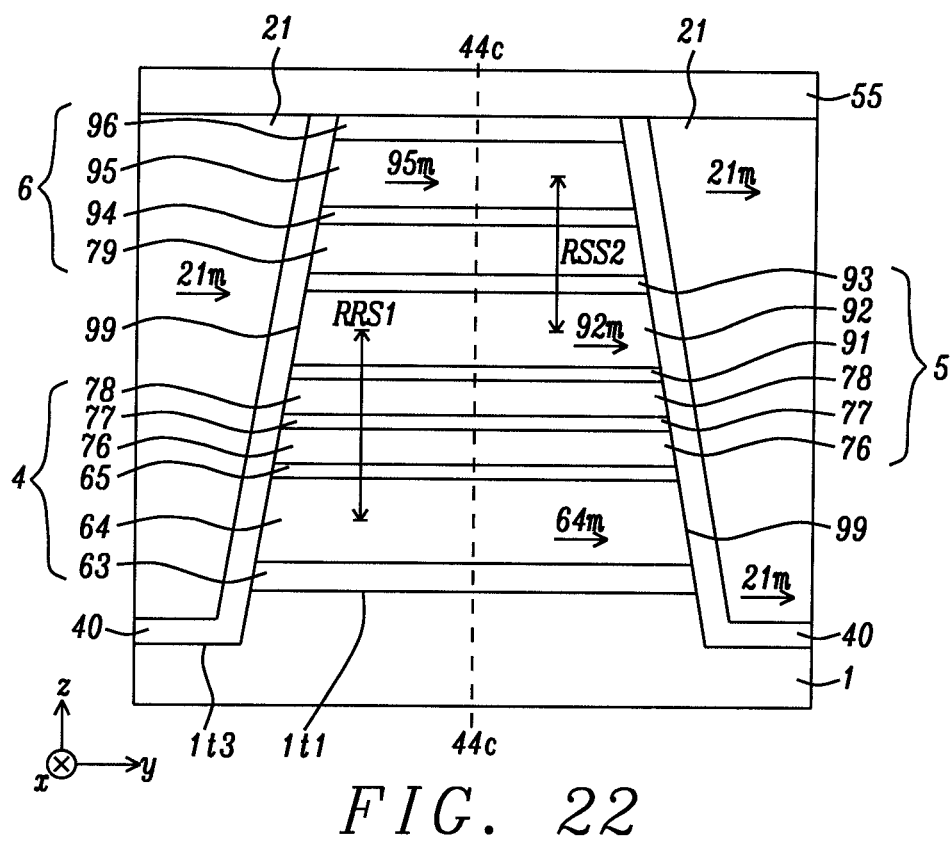
FIG. 22 is an ABS view of the triple reader structure in FIG. 21.

FIG. 21 depicts a down-track cross-sectional view after PR6 is removed and TS2 55 is deposited on cap layer 96 and INS4 87. FIG. 22 is an ABS view of the triple reader structure in FIG. 21 showing isolation layer 40 on sidewalls 99 and on BS1 top surface 1t3, and junction shields 21 adjoining the isolation layer on each side of center plane 44c-44c. Similar to the dual reader embodiment, RRS1 is considerably reduced compared with RRS in the prior art. Furthermore, RRS2 is the down-track distance from the middle of FL2 92 to the middle of FL3 95 and is substantially less than RRS in the prior art because of the absence of shields (and an intervening dielectric layer) between the second and third sensors. FL3 has magnetization 95m.

Figure 23:
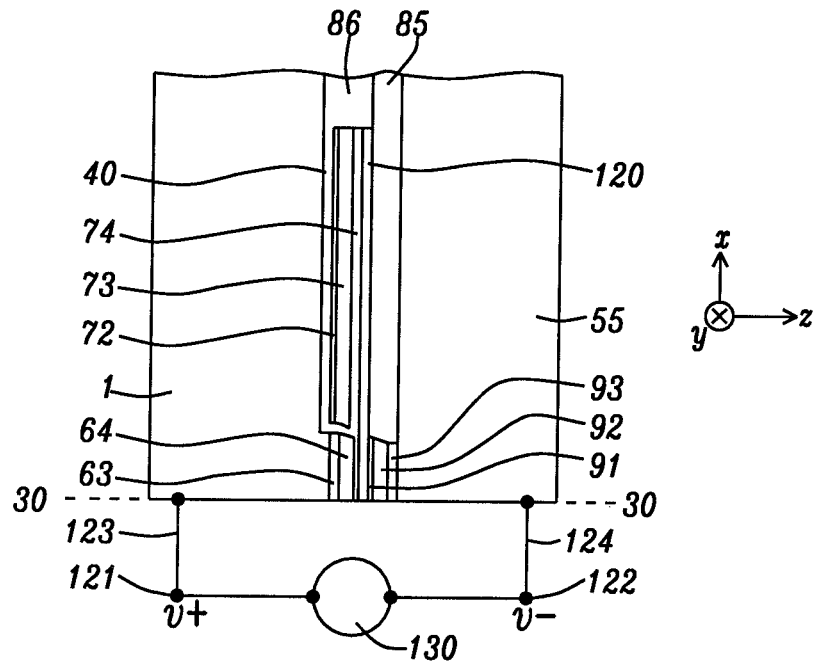
FIG. 23 is a schematic drawing that depicts a single differential connection to the first (bottom) shield and to the second (top) shield in a dual reader design according to an embodiment of the present disclosure.

In FIG. 23, the dual reader in FIG. 6A is depicted with a single differential connection to the first shield (BS1) 1 and to the second shield (TS2) 55 according to an embodiment of the present disclosure. A voltage source 130 has a V+ terminal 121 and a V− terminal 122 wherein the V+ terminal is connected to the bottom shield 1 with lead 123, and the V− terminal is linked to the top shield 55 using lead 124. Connections typically extend from the back of the sensors through the shields to pads that are linked to external sources.

Figure 24:
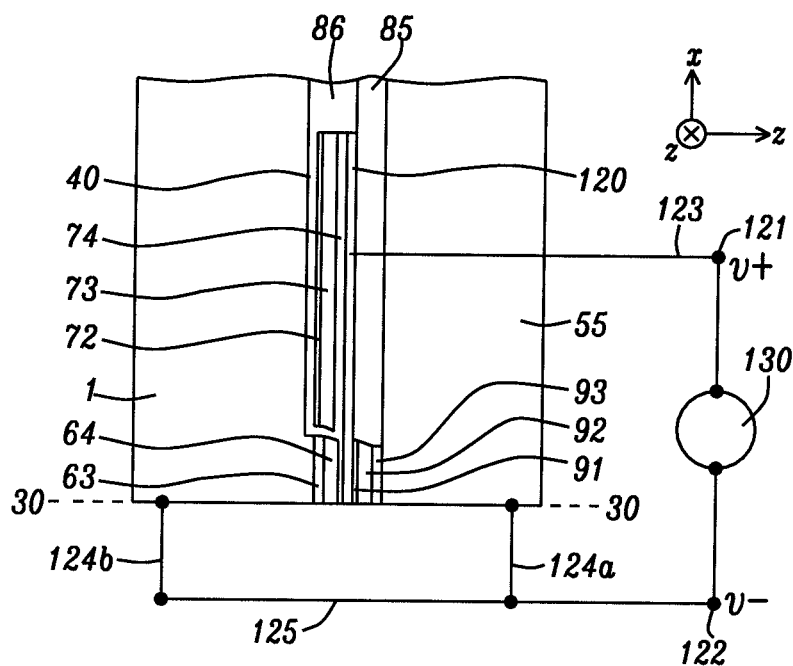
FIG. 24 is a schematic drawing that depicts a single differential connection with one end to the pinned layer and other end to the first (bottom) shield, and with the first shield electrically connected to the second (top) shield in a dual reader design according to another embodiment of the present disclosure.

FIG. 24 shows the dual reader in FIG. 6A with an alternative configuration for a single differential connection where the voltage source 130 has a V+ terminal 121 that is connected to the RL 120, and the V− terminal 122 is electrically connected to TS2 55 with lead 124a. Moreover, lead 124a has a link 125 to lead 124b that is attached to BS1 1.

Figure 25:
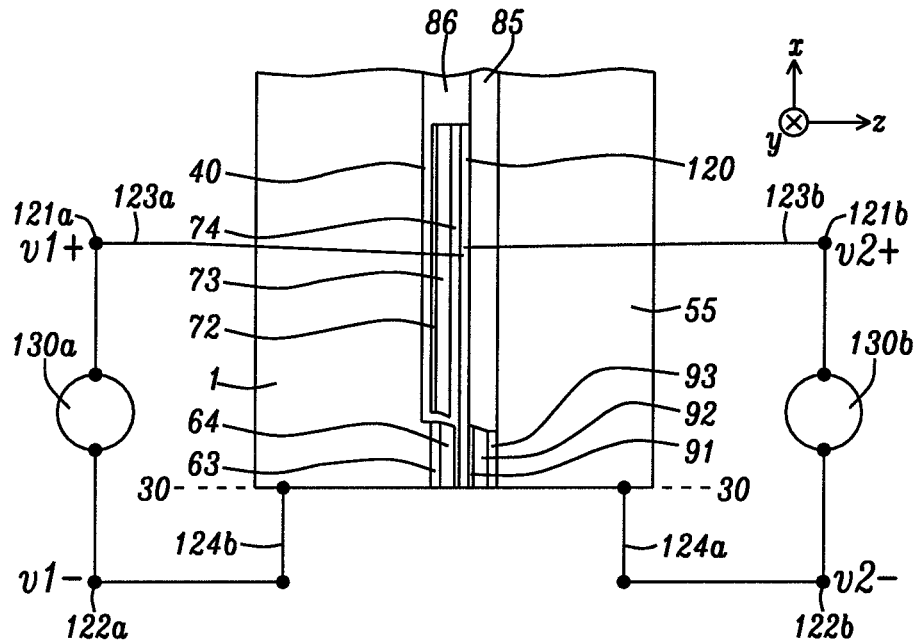
FIG. 25 is a schematic drawing with two differential connections where the pinned layer is linked to the first shield with one connection, and is linked to the second shield with the second connection according to an embodiment of the present disclosure.

Referring to FIG. 25, the dual reader in FIG. 6A is depicted with another configuration comprised of two differential connections. There is a first voltage source 130a having a V1+ terminal 121a with a lead 123a to RL 120, and a V1− terminal 122a with a lead 124b to BS1. A second voltage source 130b has a V2+ terminal 121b with a lead 123b to RL 120, and a V2− terminal 122b with a lead 124a to TS2 55. Thus, the first connection is between the PL and first shield while the second connection is between the PL and second shield.

Figure 26:
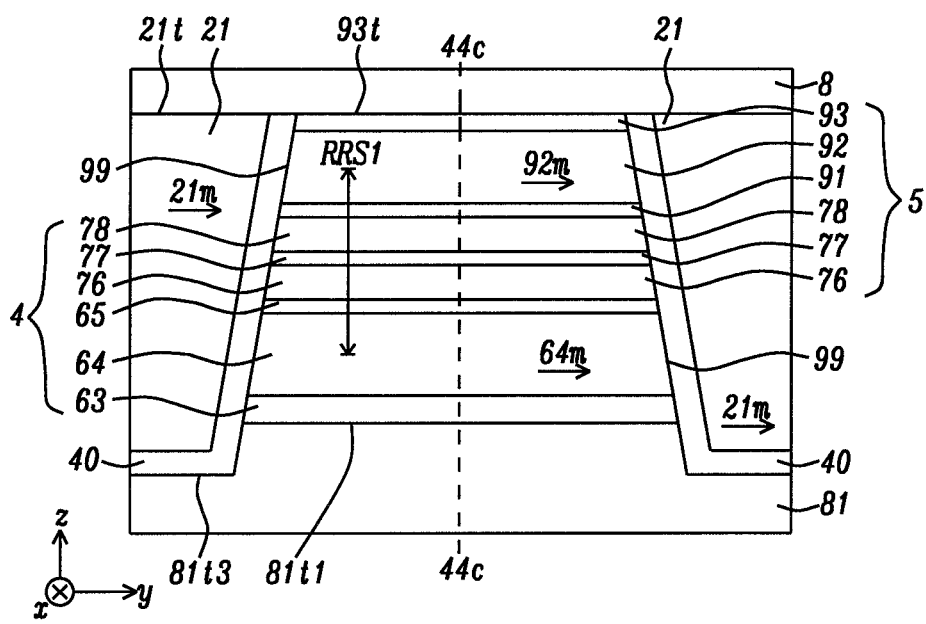
FIG. 26 is an ABS view of a dual reader structure wherein two sensors are configured in differential mode, and top and bottom shields in FIG. 7 are replaced by insulation layers according to an embodiment of the present disclosure.

As shown in FIG. 26, the present disclosure also encompasses an embodiment that when the two sensors in a dual reader are operated in a differential mode, the shields (BS1 1 and TS2 55) are optional, and are replaced with bottom insulation layer 81 and top insulation layer 8, respectively, in the exemplary embodiment. Accordingly, the first stack of layers and insulation layer 40 in a dual reader may be formed on insulation layer top surfaces 81t1 and 81t3, respectively. Furthermore, the capping layer 93 may contact insulation layer 8 at the ABS position.

The dual reader or triple reader structure of the present disclosure are expected to enable the optimum ADC gain that can be realized from a multiple reader structure because of the self-aligned sensor structures where each sensor is bisected by the center plane to avoid misalignment in the cross-track direction. Moreover, reader-to-reader separation is substantially reduced because of the shared reference layer between the first and second sensors, and elimination of shields between first and second sensors, and between second and third sensors in a triple reader. Also, with the removal of shields between the first and second sensors, there is less risk of domain wall motion in the shield structure having an adverse effect on free layer magnetization stability. When the sensors are connected in differential mode, noise associated with the common mode DC field may be eliminated to provide improved sensitivity in reading transitions, which should help to enhance data recovery capability.

While this disclosure has been particularly shown and described with reference to, the preferred embodiments thereof, it will be understood by those skilled in the art that various changes in form and details may be made without departing from the spirit and scope of this disclosure.

I claim:

1. A magnetic read head structure, comprising:
   (a) a first stack of layers formed on a substrate and with a front side at an air bearing surface (ABS); comprising:
   (1) a first seed layer (S1) on the substrate;
   (2) a first free layer (FL1) on S1 and with a first magnetization in a first cross-track direction and a backside at a first height (h1) from the ABS;
   (3) a first tunnel barrier (TB1) on FL1; and
   (4) a first sub-layer of a reference layer (RL) on TB1;
   (b) a second stack of layers with a front side adjoining a first insulation layer (INS1) that contacts the backside of FL1, and having a backside at a third height (h3) from the ABS where h3>h1, comprising:
   (1) a second seed layer (S2) formed on INS1;
   (2) an antiferromagnetic (AFM) layer on S2;
   (3) a pinned layer (PL) on the AFM layer wherein the PL has a magnetization that is pinned in a first transverse direction by the AFM layer;
   (4) a first antiferromagnetic (AF) coupling layer on the PL; and
   (5) a second sub-layer of the RL on the first AF coupling layer;
   (c) an upper RL portion formed on the first and second RL sub-layers wherein the upper RL portion has a front side at the ABS and a backside at h3, and has at least one magnetic layer with a magnetization in a second transverse direction that is opposite to the first transverse direction, and thereby forming a first sensor comprised of the first stack of layers, the second RL sub-layer, and the upper RL portion, and the reference layer (RL) comprised of the first and second RL sub-layers and upper RL portion;
   (d) a third stack of layers formed on the RL upper portion, and with a front side at the ABS; comprising:
   (1) a second tunnel barrier layer (TB2) on the upper RL portion;
   (2) a second free layer (FL2) on TB2 and having a second magnetization in the first cross-track direction and a backside adjoining a second insulation layer (INS2) at a second height (h2) from the ABS where h2<h3; and
   (3) a first capping layer on FL2 thereby forming a second sensor comprised of the third stack of layers, the first and second RL sub-layers, and the upper RL portion wherein a continuous sidewall is formed on each side of the first and second sensors, and the two sidewalls are equidistant from a center plane at the ABS; and
   (e) a junction shield formed adjacent to each of the two sidewalls wherein a magnetization provides longitudinal biasing to the first and second magnetizations in FL1 and FL2, respectively.

2. The magnetic read head structure of claim 1 wherein the upper RL portion is comprised of a third RL sub-layer on the first and second RL sub-layers thereby forming a first reference layer (RL1), a second AF coupling layer (AFC2) on RL1, and a second reference layer (RL2) on AFC2 to give a RL1/AFC2/RL2 reference layer (RL) configuration, wherein RL1 is the magnetic layer with the magnetization in the second transverse direction, and RL2 has a magnetization in the first transverse direction.

3. The magnetic read head structure of claim 1 wherein the upper RL portion is a single magnetic layer so that the first and second RL sub-layers, and the upper RL portion form a single RL with the magnetization in the second transverse direction.

4. The magnetic read head structure of claim 2 further comprised of a third AF coupling layer (AFC3) on RL2 and a third reference layer (RL3) on the third AF coupling layer to give a RL1/AFC2/RL2/AFC3/RL3 RL configuration, wherein RL3 has a magnetization in the second transverse direction.

5. The magnetic read head structure of claim 1 wherein h3 is about 1 micron or less.

6. The magnetic read head structure of claim 1 further comprised of a top shield formed on a top surface of the first capping layer and INS2, and wherein the substrate is a first bottom shield (BS1).

7. The magnetic read head structure of claim 1 wherein a reader-to-reader separation between a middle of FL1 and a middle of FL2 is about 50 nm or less.

8. The magnetic read head structure of claim 6 wherein the first and second sensors are electrically connected with a single differential connection to the top shield and to BS1.

9. The magnetic read head structure of claim 6 wherein the first and second sensors are electrically connected with a single differential connection with one end to the RL and the other end to BS1, and wherein BS1 is electrically connected to the top shield.

10. The magnetic read head structure of claim 6 wherein the first and second sensors are electrically connected with two differential connections wherein one connection is from the RL to BS1, and the other connection is from the RL to the top shield.

11. The magnetic read head structure of claim 2 wherein the first and second sensors operate in a differential mode wherein readout signals from FL1 and FL2 rotations under a direct current (DC) field will provide essentially a zero readout signal, but the readout signals from each of the first and second sensors will add to each other under an alternating current (AC) field.

12. The magnetic read head structure of claim 4 wherein the first and second sensors may operate in either a common mode or differential mode.

13. The magnetic read head structure of claim 1 further comprising;
   (a) a fourth stack of layers having a lower second AFM layer (AFM2) on INS2, a second PL (PL2) on AFM2, and a second AF coupling layer (AF2) on PL2 where AF2 has a top surface coplanar with a top surface of the first capping layer;

(b) a second reference layer (RL2) formed on the first capping layer and on AF2, and with a backside proximate to h3; and (c) a fifth stack of layers formed on RL2, comprising;
  (1) a third tunnel barrier layer (TB3) on RL2;
  (2) a third free layer (FL3) on TB3 and having a third magnetization in the first cross-track direction and a backside adjoining a third insulation layer (INS3) at a fourth height (h4) from the ABS where h4<h3; and
  (3) a second capping layer on FL3 thereby forming a third sensor comprised of the fifth stack of layers and RL2 and wherein the two sidewalls extend to a top surface of the second capping layer, and the junction shields also provide longitudinal biasing to the third magnetization.

14. The magnetic read head structure of claim 13 further comprised of a top shield formed on a top surface of the second capping layer and INS3, and wherein the substrate is a first bottom shield (BS1).

15. A head gimbal assembly (HGA), comprising:

(a) the magnetic read head structure of claim 1; and (b) a suspension that elastically supports the magnetic read head structure, wherein the suspension has a flexure to which the magnetic read head structure is joined, a load beam with one end connected to the flexure, and a base plate connected to the other end of the load beam.

16. A magnetic recording apparatus, comprising:

(a) the HGA of claim 15;

(b) a magnetic recording medium positioned opposite to a slider on which the magnetic read head structure is formed;

(c) a spindle motor that rotates and drives the magnetic recording medium; and (d) a device that supports the slider, and that positions the slider relative to the magnetic recording medium.

* * * * *